US011981793B2

(12) United States Patent
Ehlis et al.

(10) Patent No.: US 11,981,793 B2
(45) Date of Patent: May 14, 2024

(54) USE OF AN ULTRAVIOLET RADIATION ABSORBING COMPOSITION AS A LIGHT STABILIZER FOR A SHAPED ARTIFICIAL POLYMER ARTICLE

(71) Applicant: BASF SE, Ludwigshafen am Rhein (DE)

(72) Inventors: Thomas Ehlis, Schweizerhalle (CH); Heinz Herbst, Kaisten (CH); Daniel Mueller, Kaisten (CH); Manuele Vitali, Pontecchio Marconi BO (IT); Gregor Huber, Kaisten (CH)

(73) Assignee: BASF SE, Ludwigshafen am Rhein (DE)

( * ) Notice: Subject to any disclaimer, the term of this patent is extended or adjusted under 35 U.S.C. 154(b) by 719 days.

(21) Appl. No.: 17/045,002

(22) PCT Filed: Apr. 1, 2019

(86) PCT No.: PCT/EP2019/058123
§ 371 (c)(1),
(2) Date: Oct. 2, 2020

(87) PCT Pub. No.: WO2019/192943
PCT Pub. Date: Oct. 10, 2019

(65) Prior Publication Data
US 2021/0163710 A1 Jun. 3, 2021

(30) Foreign Application Priority Data
Apr. 4, 2018 (EP) ..................... 18165595

(51) Int. Cl.
*C08K 5/3475* (2006.01)
*C08K 5/06* (2006.01)

(52) U.S. Cl.
CPC ............. *C08K 5/3475* (2013.01); *C08K 5/06* (2013.01); *C08K 2201/014* (2013.01); *C08K 2201/019* (2013.01)

(58) Field of Classification Search
CPC .................................................. C08K 5/3475
USPC ...................................................... 548/257
See application file for complete search history.

(56) References Cited

U.S. PATENT DOCUMENTS

| | | |
|---|---|---|
| 4,185,009 A | 1/1980 | Idel et al. |
| 4,325,863 A | 4/1982 | Hinsken et al. |
| 4,338,244 A | 7/1982 | Hinsken et al. |
| 5,175,312 A | 12/1992 | Dubs et al. |
| 5,216,052 A | 6/1993 | Nesvadba et al. |
| 5,252,643 A | 10/1993 | Nesvadba |
| 5,367,044 A | 11/1994 | Rosenquist |
| 6,369,267 B1 | 4/2002 | Toan et al. |
| 6,620,904 B2 | 9/2003 | Lemke |
| 2002/0058781 A1 | 5/2002 | Lemke |
| 2002/0094320 A1 | 7/2002 | Toan et al. |
| 2015/0164771 A1 | 6/2015 | Daly et al. |

(Continued)

FOREIGN PATENT DOCUMENTS

| | | |
|---|---|---|
| AU | 4554400 A | 11/2000 |
| CN | 105213219 A | 1/2016 |
| DE | 25 00 092 A1 | 7/1976 |

(Continued)

OTHER PUBLICATIONS

Extended European Search Report dated Oct. 26, 2018 in European Patent Application No. 181655952, citing documents AA, AO, and AP therein, 3 pages (Continued)

*Primary Examiner* — Taofiq A Solola
(74) *Attorney, Agent, or Firm* — ArentFox Schiff LLP

(57) ABSTRACT

An ultraviolet radiation absorbing composition can be used as a light stabilizer for a shaped artificial polymer article, wherein the polymer is a synthetic polymer and/or a natural elastomer and wherein the ultraviolet radiation absorbing composition includes the compound of formula (I)

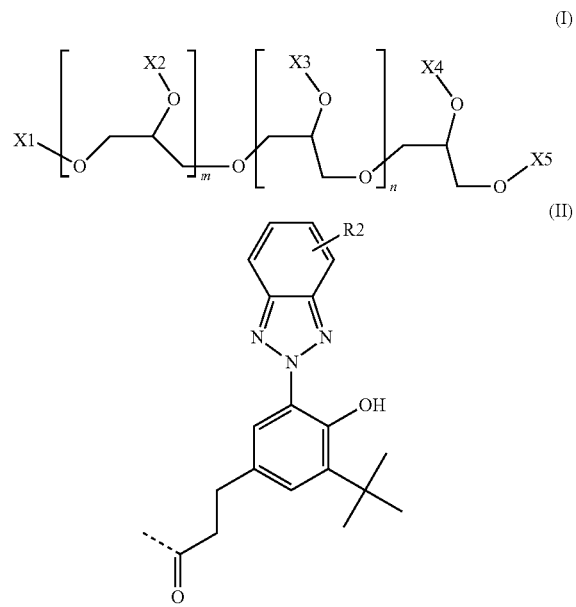

wherein n and m are independently 0 to 20, and at least one of m and n being ≥1; and X1, X2, X3, X4 and X5 are the same or different and are independently selected from H, C(O)R1 with R1 being $C_8$-$C_{24}$-alkyl, or a group of the general formula (II) wherein R2 is H or halogen.

18 Claims, 1 Drawing Sheet

(56) References Cited

U.S. PATENT DOCUMENTS

| | | |
|---|---|---|
| 2015/0320671 A1 | 11/2015 | Daly et al. |
| 2018/0092819 A1 | 4/2018 | Ehlis et al. |

FOREIGN PATENT DOCUMENTS

| | | |
|---|---|---|
| DE | 43 16 611 A1 | 11/1993 |
| DE | 43 16 622 A1 | 11/1993 |
| DE | 43 16 876 A1 | 11/1993 |
| DE | 42 40 313 A1 | 6/1994 |
| DE | 199 43 642 A1 | 3/2001 |
| EP | 0 589 839 A1 | 3/1994 |
| EP | 0 591 102 A1 | 4/1994 |
| EP | 1 291 384 A1 | 3/2003 |
| EP | 1 506 249 A1 | 2/2005 |
| EP | 1 582 549 A1 | 10/2005 |
| EP | 3 305 279 A1 | 4/2018 |
| JP | 2-172938 A | 7/1990 |
| JP | 2000-515141 A | 11/2000 |
| JP | 2007114576 B2 | 5/2007 |
| JP | 2007534781 A | 11/2007 |
| JP | 2012-016843 A | 1/2012 |
| JP | 2013-155121 A | 8/2013 |
| JP | 2017-194087 A | 10/2017 |
| JP | 2018-080158 A | 5/2018 |
| RU | 2249606 C2 | 4/2005 |
| TW | 201414521 A | 4/2014 |
| WO | 0066676 A1 | 11/2000 |
| WO | WO 02/26862 A1 | 4/2002 |
| WO | WO 02/36534 A2 | 5/2002 |
| WO | WO 2005/113639 A1 | 12/2005 |
| WO | WO 2007/092407 A2 | 8/2007 |
| WO | WO 2008/037364 A1 | 4/2008 |
| WO | WO 2011/098315 A1 | 8/2011 |
| WO | 2013/024781 A1 | 2/2013 |
| WO | WO 2015/122770 A1 | 8/2015 |
| WO | WO 2018/065341 A1 | 4/2018 |

OTHER PUBLICATIONS

International Search Report dated Jun. 26, 2019 in PCT/EP2019/058123 filed on Apr. 1, 2019.

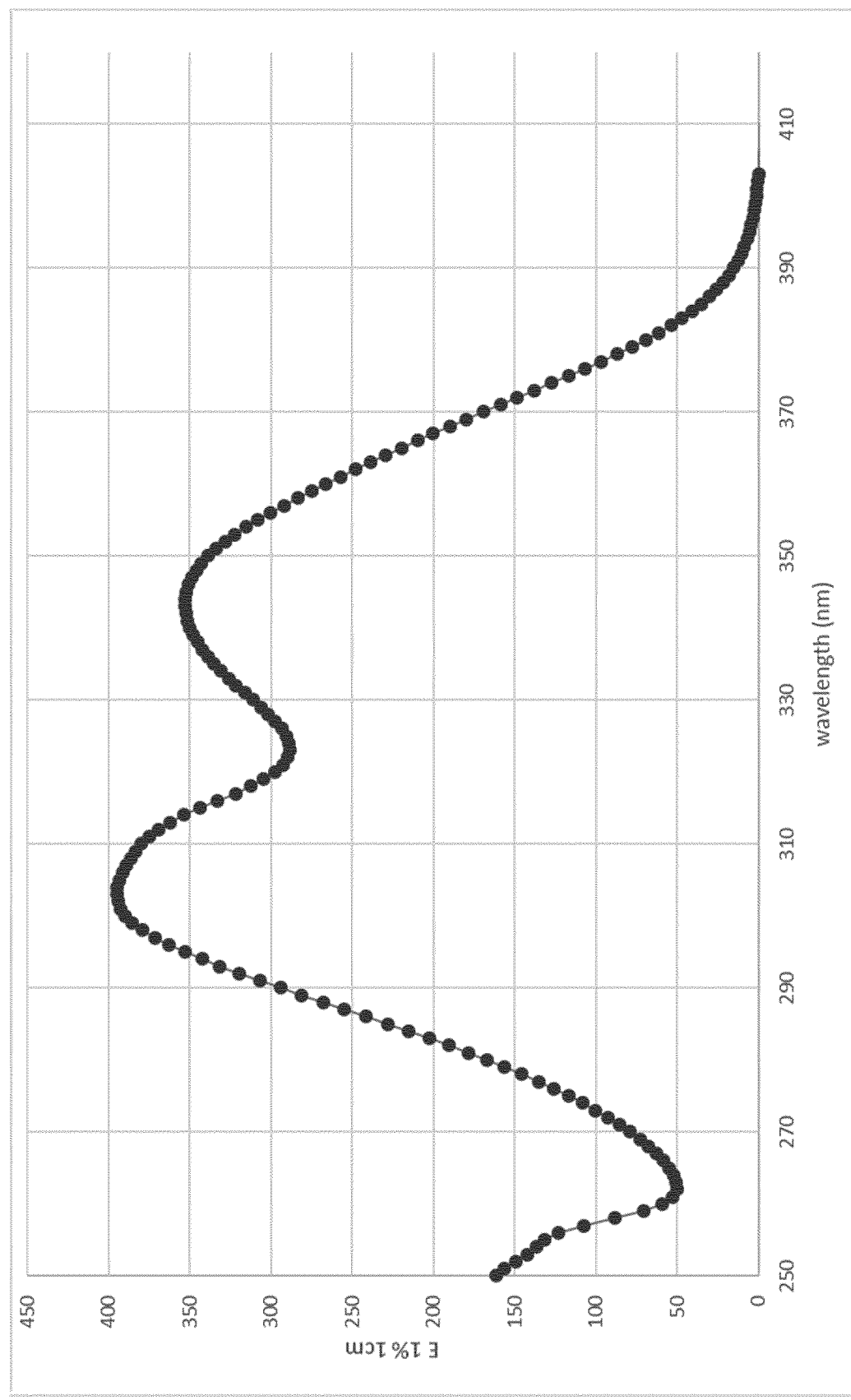

USE OF AN ULTRAVIOLET RADIATION ABSORBING COMPOSITION AS A LIGHT STABILIZER FOR A SHAPED ARTIFICIAL POLYMER ARTICLE

The present invention relates to the use of an ultraviolet radiation absorbing composition as a light stabilizer for a shaped artificial polymer article, the stabilized shaped artificial polymer article and an extruded, molded or calendered polymer composition containing the ultraviolet radiation absorbing composition.

The present invention relates in particular to the use of an ultraviolet radiation absorbing composition (an additive composition) as a light stabilizer for a shaped artificial (or industrial) polymer article, wherein the polymer is a synthetic polymer and/or a natural elastomer and wherein the ultraviolet radiation absorbing composition comprises the compound of the general formula (I)

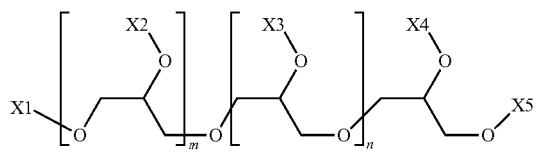
(I)

wherein n and m, independently from each other, are a number from 0 to 20, and at least one of m and n is ≥1; and X1, X2, X3, X4 and X5 are the same or different and are independently selected from H, C(O)R1 with R1 being $C_8$-$C_{24}$-alkyl, or a group of the general formula (II)

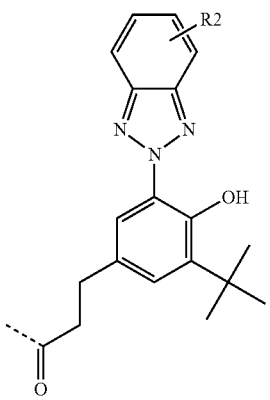
(II)

with R2 being H or halogen.

It is preferred that in the compound of the general formula (I), n and m, independently from each other, are a number from 0 to 20, and at least one of m and n is ≥1; and X1, X2, X3, X4 and X5 are the same or different and are independently selected from H, C(O)R1 with R1 being $C_8$-$C_{24}$-alkyl, or a group of the general formula (II)

(II)

with R2 being H.

More preferably, in the compound of the general formula (I), n and m, independently from each other, are a number from 0 to 20, and at least one of m and n is ≥1; and X1, X2, X3, X4 and X5 are the same or different and are independently selected from H, or a group of the general formula (II)

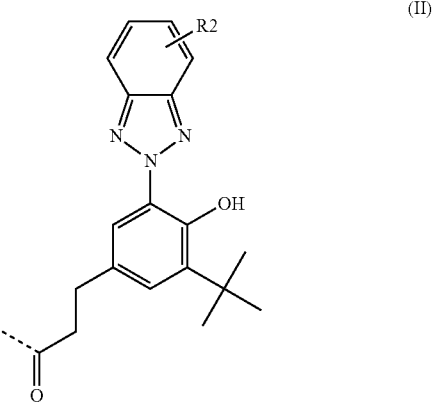
(II)

with R2 being H.

Alternatively, in the compound of the general formula (I), n and m, independently from each other, are a number from 0 to 20, and at least one of m and n is ≥1; and X1, X2, X3, X4 and X5 are the same or different and are independently selected from C(O)R1 with R1 being $C_8$-$C_{24}$-alkyl, or a group of the general formula (II)

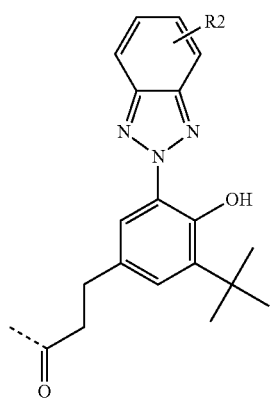

(II)

with R2 being H.

Alternatively, in the compound of the general formula (I), n and m, independently from each other, are a number from 0 to 20, and at least one of m and n is ≥1; and X1, X2, X3, X4 and X5 are the same or different and are independently selected from H, C(O)R1 with R1 being $C_8$-$C_{24}$-alkyl, or a group of the general formula (II)

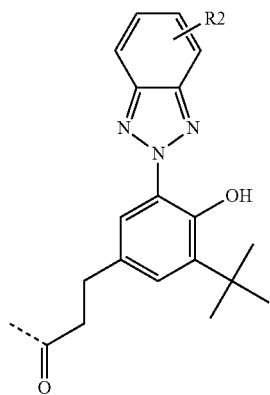

(II)

with R2 being halogen.

The term "$C_8$-$C_{24}$-alkyl" in the meaning of the present invention refers to a linear or branched chain alkyl group having 8 to 24 carbon atoms, and includes, for example, octyl, nonyl, decanyl, undecanyl, dodecanyl, lauryl, myristyl, palmityl, stearyl, arachinyl, behenyl.

Preferably, R1 in the compound of the general formula (I) is $C_{12}$-$C_{22}$-alkyl, more preferably $C_{14}$-$C_{20}$-alkyl and most preferably $C_{16}$- or $C_{18}$-alkyl, such as palmityl or stearyl. For example, R1 in the compound of the general formula (I) is stearyl.

The term "halogen" in the meaning of the present invention refers to fluoro, chloro, bromo or iodo. Preferably, the halogen is chloro.

Accordingly, if R2 in the group of the general formula (II) is a halogen, R2 is preferably chloro.

However, in one preferred embodiment R2 in the group of the general formula (II) is H.

In one embodiment, X1, X2, X4 and X5 in the compound of the general formula (I) are the same. Preferably, X1, X2, X4 and X5 in the compound of the general formula (I) are the same and are a group of the general formula (II)

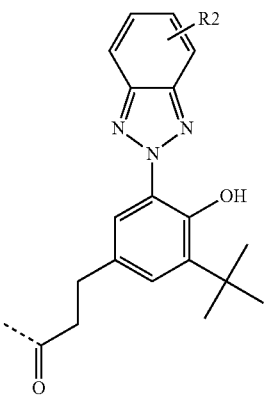

(II)

with R2 being H or halogen, preferably H.

It is appreciated that X3 is preferably H or C(O)R1 with R1 being $C_8$-$C_{24}$-alkyl, more preferably C(O)R1 with R1 being $C_8$-$C_{24}$-alkyl.

In one embodiment, it is thus preferred that X3 in the compound of the general formula (I) differs from X1, X2, X4 and X5. More preferably, X1, X2, X4 and X5 in the compound of the general formula (I) are the same and are a group of the general formula (II)

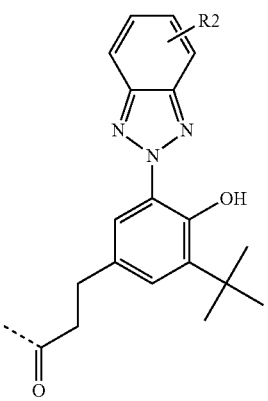

(II)

with R2 being H or halogen, preferably H, and X3 is H or C(O)R1 with R1 being $C_8$-$C_{24}$-alkyl.

For example, X1, X2, X4 and X5 in the compound of the general formula (I) are the same and are a group of the general formula (II)

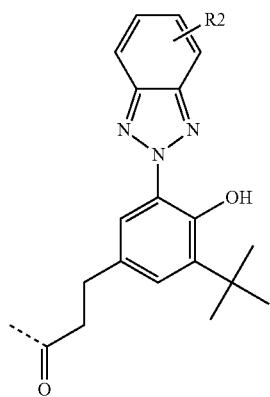

with R2 being H or halogen, preferably H, and X3 is C(O)R1 with R1 being $C_8$-$C_{24}$-alkyl.

Alternatively, X1, X2, X4 and X5 in the compound of the general formula (I) are the same and are a group of the general formula (II)

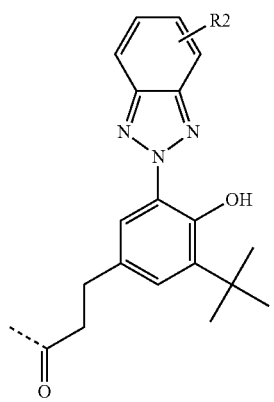

with R2 being H or halogen, preferably H, and X3 is H.

As already mentioned, n and m in the compound of the general formula (I), independently from each other, are a number from 0 to 20, and at least one of m and n is ≥1. It is preferred that n and m in the compound of the general formula (I), independently from each other, are a number from 1 to 20. That is to say, m and n are 1.

In one embodiment, n and m in the compound of the general formula (I), independently from each other, are a number from 1 to 18, preferably from 1 to 16 and most preferably from 1 to 15.

It is appreciated that m and n, independently from each other, are a number selected from 1, 2, 3, 4, 5, 6, 7, 8, 9, 10, 11, 12, 13, 14 and 15.

In general, the compound of the general formula (I) comprises an amount of covalently bound chromophores of >70 wt.-%, based on the total weight of the compound of the general formula (I).

Additionally or alternatively, the compound of the general formula (I) has E 1% 1 cm (343-344 nm) of >200 nm.

The compound of the general formula (I) represents a UV absorbing polyether that absorbs radiation in wavelengths between 290 and 400 nm.

According to one embodiment, the compound of the general formula (I) has an average molecular weight ($M_w$) of >300 Da. In one embodiment, $M_w$ is in the range of about 300 to about 50,000 Da. In another embodiment, the $M_w$ is in the range of about 500 to about 20,000 Da, such as from about 500 to about 10,000 Da.

The ultraviolet radiation absorbing composition comprising the compound of the general formula (I) is preferably prepared in an esterification/transesterification including the steps of reacting a polyglycerol intermediate (6 or 7), i.e. polyglycerol or polyglycerol alkylate, with a benzotriazole UV-chromophore (5) comprising a complementary functional group A to form the polymer compound (3 or 4) according to the following reaction scheme:

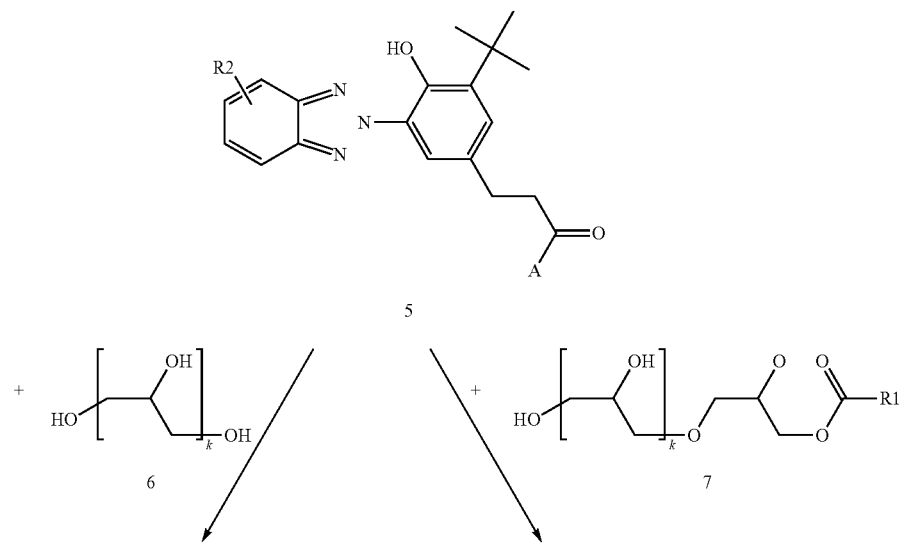

-continued

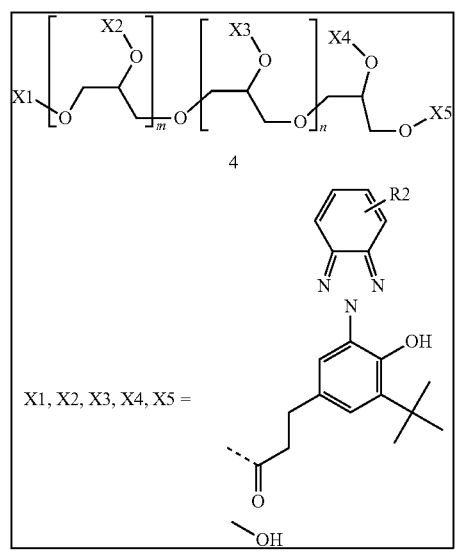

X1, X2, X3, X4, X5 =

4

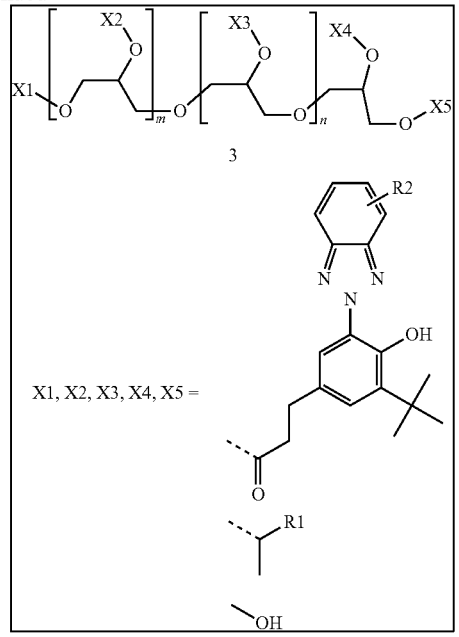

X1, X2, X3, X4, X5 =

3 wherein further n and m, independently from each other, are a number from 0 to 20, and at least one of m and n is ≥1; A is selected from OH, OMe and OEt; k is a number from 1 to 40; R1 being $C_8$-$C_{24}$-alkyl and R2 is H or halogen.

Such processes are well known in the art and are for example described in US2015 0164771.

The benzotriazole derivatives according to formula (5) represent the UV chromophore moiety of the present ultraviolet radiation absorbing composition.

Most preferred compounds according to formula (5) are benzenepropanoic acid, 3-(2H-benzotriazol-2-yl)-5-(1,1-dimethylethyl)-4-hydroxy-,methyl ester corresponding to formula (5a)

<img of compound 5a>

(CAS Registry Number 84268-33-7);
benzenepropanoic acid, 3-(2H-benzotriazol-2-yl)-5-(1,1-dimethylethyl)-4-hydroxy- corresponding to formula (5b)

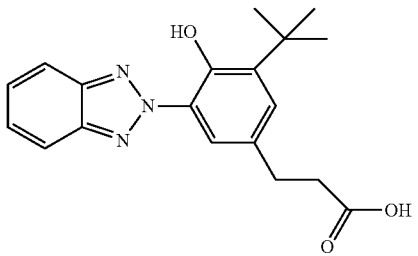

(CAS Registry Number 84268-36-0),
or the compound according to formula (5a) or (5b) having a chloro substituent corresponding to formula (5c)

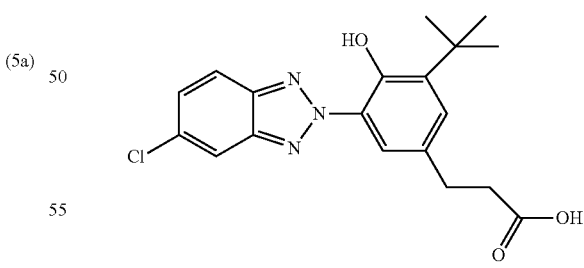

Preferably, the compound according to formula (5) is a compound corresponding to formula (5a) or (5b).

Polyglycerol (CAS Registry Number 25618-55-7; 1, 2, 3-propanetriol, homopolymer) corresponding to formula (6) is known as a versatile building block for sustainable cosmetic raw materials (Wenk, H. H.; Meyer, J.; SOFW Journal, 2009, volume 135, issue 8, pages 25-30).

Polyglycerol is an ether linked homopolymer of glycerol, which is available in different degrees of polymerization, where higher polymers are associated with increasing hydrophilicity and molecular weight. Although the idealized structure of polyglycerol—a 1,3-linked, linear polymer is rather simple, the reality is much more complex. Polyglycerols are mixtures of a number of structures, which are defined by oligomer distribution, degree of branching, and amount of cyclic structures. Even products with the same average molecular weight may differ significantly in their properties.

The oligomerization of glycerol is a consecutive reaction, and complete conversion of glycerol favors formation of high molecular-weight glycerol oligo- and polymers.

The general structural formula for polyglycerol can be sketched from the following formula (8) as

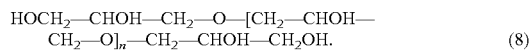

(8)

wherein
n=0 results in diglycerol,
n=1 in triglycerol, n=2 in tetraglycerol etc., including branched isomers formed by reaction of secondary hydroxyls.

Beside linear polyglycerol cyclic oligomers can be formed by further condensation (Diglycerin and hoehere Oligomere des Glycerins als Synthesebausteine, Jakobson, G., Fette, Seifen Anstrichmittel, 1986, volume 88, pages 101-106).

With the increase of molecular weight the hydroxyl number of polyglycerol decreases (diglycerol comprises 4, triglycerol 5, tetraglycerol 6 etc. hydroxy groups). In some embodiments, the glycerol-based composition is fractionated to produce the desired distribution of glycerol polymers and a desired hydroxyl value.

Detailed synthesis procedures for the preparation of polyglycerol are described in WO2011098315, WO2015122770, WO2002036534, US20020058781, U.S. Pat. No. 6,620,904 and WO2007092407.

Preferred catalysts for the preparation of polyglycerol are $K_2CO_3$, $Li_2CO_3$, $Na_2CO_3$, KOH, NaOH, $CH_3ONa$, $Ca(OH)_2$, LiOH, $MgCO_3$, MgO, CaO, $CaCO_3$, ZnO, CsOH, $Cs_2CO_3$, $NaHCO_3$, $CsHCO_3$, SrO and BaO.

The reaction is preferably carried out between 230 and 260° C.

Processes for the preparation of polyglycerol alkylates corresponding to the general formula (7) are also well known and are for example described in US2015 0164771, page 3, paragraph [0020], which is thus herewith incorporated by reference.

Polyglycerols and polyglycerol alkylates corresponding to the general formulae (6) and (7) are also commercially available from a great variety of sources. For example, polyglycerin #310, polyglycerin #500, polyglycerin #750, decaglycerol tri-stearate (TS-7S), decaglycerol deca-stearate (DAS-7S), hexaglycerol mono-stearate (MS-5S)hexaglycerol di-stearate (SS-5S) are available from Sakamoto Yakuhin Kogyo Co., Ltd., Japan. Natrulon H-6 (Polyglycerin-6), Natrulon H-10 (Polyglycerin-10), polyglyceryl-10 decaoleate (Polyaldo® 10-10-0), polyglyceryl-3 stearate (Polyaldo® 3-1-S), polyglyceryl-6 distearate (Polyaldo® 6-2-S), polyglyceryl-10 stearate (Polyaldo® 10-1-S), polyglyceryl-10 dipalmitate (Polyaldo® 10-2-P), polyglyceryl-10 oleate (Polyaldo® 10-1-0) and polyglyceryl-10 caprylate/caprate (Polyaldo® 10-1-CC) are available from Lonza AG, Switzerland. Polyglycerine-10, Polyglycerine-6, Polyglycerine-4, Polyglycerine-3 is available from Spiga Nord S.p.A., Italy.

The ultraviolet radiation absorbing composition according to the present invention is composed of a complex combination of different molecules (complex reaction products).

This is further illustrated in formula (Ia) representing a preferred polymer compound of the general formula (I) according to the present invention based on a polyglycerol backbone containing 5 glycerol units (examples without limitation):

(Ia)

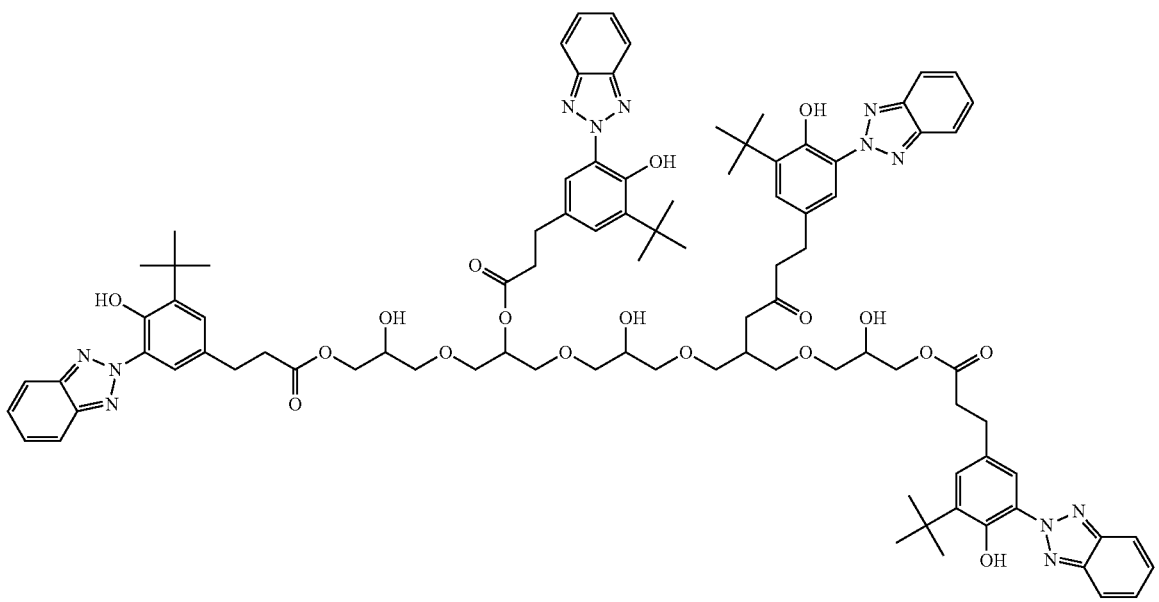

The glycerol backbone typically consists mainly of 3 to 20 glycerol units, whereby the hydroxyl groups of the glycerol backbone are covalently linked to the benzotriazole UV chromophore. It might be reasonably assumed that primary hydroxyl groups (terminal units) react faster than secondary hydroxyl groups, which are less reactive for derivatization. Therefore, some secondary hydroxyl groups remain unreacted. The glycerol backbone consists of primarily linear and unbranched structure units. Branched isomers and higher molecular fractions including more than 20 glycerol units can be present.

Minor components e.g. benzotriazole conjugates of cyclic glycerol oligomers (examples without limitation):

Benzenepropanoic acid, 3-(2H-benzotriazol-2-yl)-5-(1,1-dimethylethyl)-4-hydroxy-: 5.0% (HPLC).

Sum of concentration of benzenepropanoic acid, 3-(2H-benzotriazol-2-yl)-5-(1,1-dimethylethyl)-4-hydroxy-, methyl ester and benzenepropanoic acid, 3-(2H-benzotriazol-2-yl)-5-(1,1-dimethylethyl)-4-hydroxy-: 5.0% (HPLC).

UV-absorption: E 1% 1 cm (344 nm): >200.

Amount of bound chromophores: >70%.

Residual catalyst from transesterification reaction (Tin-II-ethyl hexanoate)<700 ppm or essentially free of Sn (IPC)

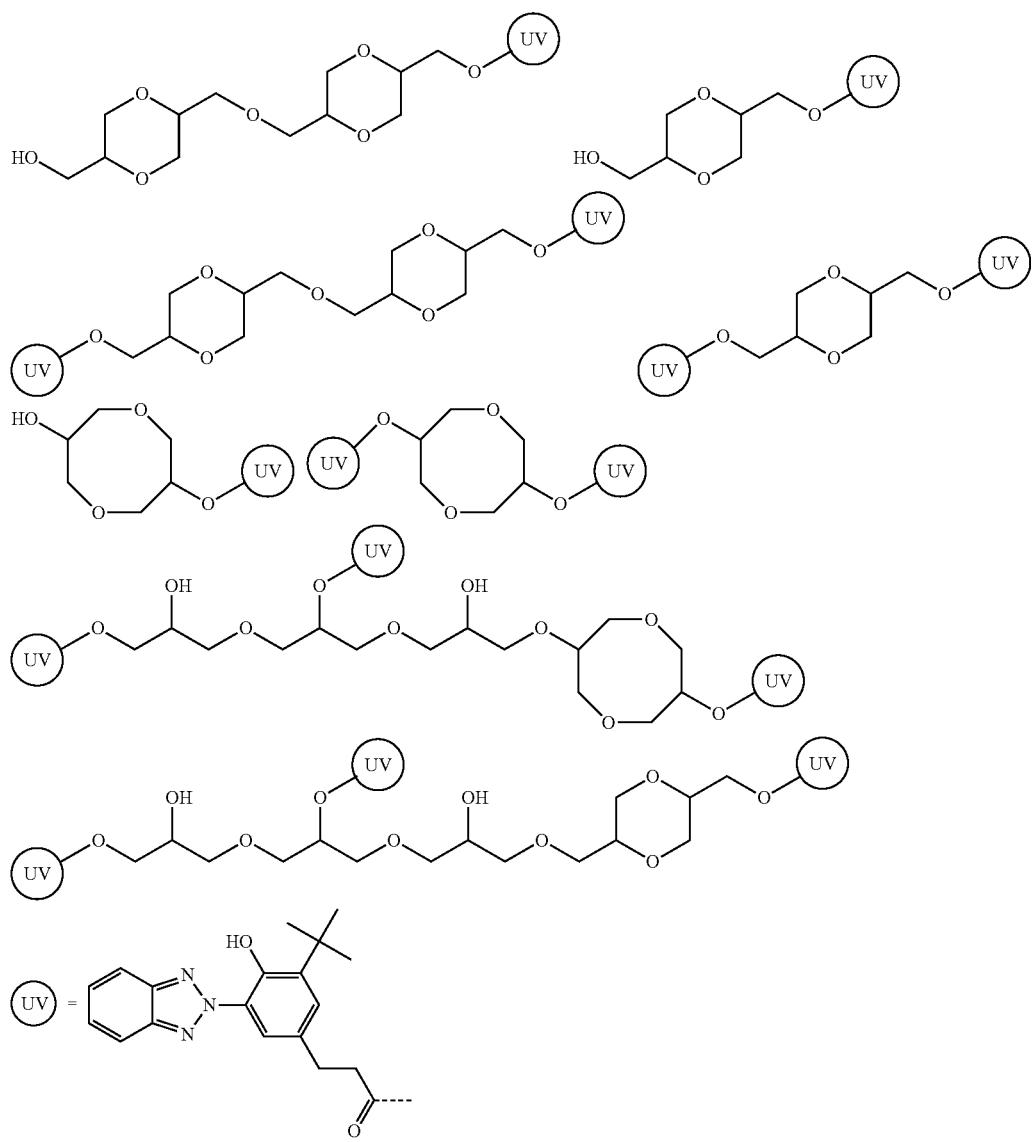

The composition comprising the compound of the formula (Ia) is characterized as follows:

MW distribution: $M_w$>300 Da (GPC, calibrated on polystyrene).

Benzenepropanoic acid, 3-(2H-benzotriazol-2-yl)-5-(1,1-dimethylethyl)-4-hydroxy-, methyl ester: 5.0% (HPLC).

The characterization of the composition is carried out according to the chapter "Methods" below.

In view of the above, it is appreciated that the ultraviolet radiation absorbing composition additionally comprises, in addition to the compound of the general formula (I), one or more components selected from the group comprising benzenepropanoic acid, 3-(2H-benzotriazol-2-yl)-5-(1,1-dimethylethyl)-4-hydroxy-, methyl ester, benzenepropanoic acid, 3-(2H-benzotriazol-2-yl)-5-(1,1-dimethylethyl)-4-hydroxy-, methanol and tin.

Preferably, the ultraviolet radiation absorbing composition additionally comprises, in addition to the compound of the general formula (I), benzenepropanoic acid, 3-(2H-benzotriazol-2-yl)-5-(1,1-dimethylethyl)-4-hydroxy-, methyl ester, benzenepropanoic acid, 3-(2H-benzotriazol-2-yl)-5-(1,1-dimethylethyl)-4-hydroxy-, methanol and tin.

Generally, the concentration of benzenepropanoic acid, 3-(2H-benzotriazol-2-yl)-5-(1,1-dimethylethyl)-4-hydroxy-, methyl ester and/or benzenepropanoic acid, 3-(2H-benzotriazol-2-yl)-5-(1,1-dimethylethyl)-4-hydroxy- in the ultraviolet radiation absorbing composition is 5.0 wt.-%, based on the total weight of the ultraviolet radiation absorbing composition.

In one embodiment, the concentration of benzenepropanoic acid, 3-(2H-benzotriazol-2-yl)-5-(1,1-dimethylethyl)-4-hydroxy-, methyl ester or benzenepropanoic acid, 3-(2H-benzotriazol-2-yl)-5-(1,1-dimethylethyl)-4-hydroxy- in the ultraviolet radiation absorbing composition is 5.0 wt.-%, based on the total weight of the ultraviolet radiation absorbing composition. Alternatively, the concentration of each of benzenepropanoic acid, 3-(2H-benzotriazol-2-yl)-5-(1,1-dimethylethyl)-4-hydroxy-, methyl ester and benzenepropanoic acid, 3-(2H-benzotriazol-2-yl)-5-(1,1-dimethylethyl)-4-hydroxy- in the ultraviolet radiation absorbing composition is 5.0 wt.-%, based on the total weight of the ultraviolet radiation absorbing composition.

Preferably, the sum of the concentrations of benzenepropanoic acid, 3-(2H-benzotriazol-2-yl)-5-(1,1-dimethylethyl)-4-hydroxy- and 3-(2H-benzotriazol-2-yl)-5-(1,1-dimethylethyl)-4-hydroxy-, methyl ester in the ultraviolet radiation absorbing composition is 5.0 wt.-%, based on the total weight of the ultraviolet radiation absorbing composition. For example, the sum of the concentrations of benzenepropanoic acid, 3-(2H-benzotriazol-2-yl)-5-(1,1-dimethylethyl)-4-hydroxy- and 3-(2H-benzotriazol-2-yl)-5-(1,1-dimethylethyl)-4-hydroxy-,methyl ester in the ultraviolet radiation absorbing composition is 4.0 wt.-%, based on the total weight of the ultraviolet radiation absorbing composition.

In one embodiment, the concentration of tin in the ultraviolet radiation absorbing composition is <700 ppm, more preferably <600 ppm and most preferably <500 ppm.

For example, the ultraviolet radiation absorbing composition is essentially free of tin.

In a preferred method the water or alcohol which is formed during the reaction is removed by distillation during the esterification/transesterification reaction.

Thus, it is preferred that the concentration of methanol in the ultraviolet radiation absorbing composition is <3,000 ppm, preferably <2,500 ppm and most preferably <2,000 ppm.

It is preferred that the esterification/transesterification is carried out at a temperature of 160-270° C., more preferably at a temperature of 190-260° C.

In a further preferred embodiment, the esterification/transesterification is carried out without any additional solvent.

In a further preferred embodiment, the esterification/transesterification is carried out without additional esterification/transesterification catalysts.

In another embodiment the esterification/transesterification is carried out under intermittent or constant vacuum of less than 250 mbar, more preferably of less than 100 mbar.

For example, the esterification/transesterification is carried out at a temperature of 190-260° C. for at least 18 h.

In a further preferred embodiment, the polyglycerol contains less than 5% of glycerol or linear and cyclic diglycerols.

In a further preferred embodiment, the hydroxyl value of polyglycerol is in the range between 700 and 1,100, more preferably between 750 and 900. The hydroxy value is expressed by the mass of potassium hydroxide (KOH) in milligrams equivalent to the hydroxyl content of one gram of the polyglycerol. If not otherwise stated, the hydroxyl value is determined by the general method described in *The International Pharmacopoeia*, Chapter 4.7 "Determination of hydroxyl value", Seventh Edition, 2017.

In one embodiment, the UV chromophore in the compound of the general formula (I) is benzenepropanoic acid, 3-(2H-benzotriazol-2-yl)-5-(1,1-dimethylethyl)-4-hydroxy- corresponding to formula (5b).

In a further preferred embodiment, the UV chromophore in the compound of the general formula (I) is benzenepropanoic acid, 3-(2H-benzotriazol-2-yl)-5-(1,1-dimethylethyl)-4-hydroxy-methyl ester corresponding to formula (5a).

In a further preferred embodiment, the final reaction product is used without further purification after synthesis.

In a further preferred embodiment, the ultraviolet radiation absorbing composition (UVRAP) is prepared by reacting 1 part of polyglycerol with 1.0-7.0 parts of benzene propanoic acid, 3-(2H-benzotriazol-2-yl)-5-(1,1-dimethylethyl)-4-hydroxy-methyl ester corresponding to formula (5b).

In another preferred embodiment, the ultraviolet radiation absorbing composition (UVRAP) is prepared by reacting 1 part of polyglycerol with 1.0-7.0 parts of benzene propanoic acid, 3-(2H-benzotriazol-2-yl)-5-(1,1-dimethylethyl)-4-hydroxy corresponding to formula (5a).

It has been specifically found out by the inventors that the ultraviolet radiation absorbing composition (UVRAP) can be used as UV absorbing agent for stabilizing a shaped artificial polymer article, wherein the polymer is a synthetic polymer or a natural elastomer.

Specific examples of a synthetic polymer or a natural elastomer are:

1. Polymers of monoolefins and diolefins, for example polypropylene, polyisobutylene, polybut-1-ene, poly-4-methylpent-1-ene, polyvinylcyclohexane, polyisoprene or poly-butadiene, polyhexene, polyoctene, as well as polymers of cycloolefins, for instance of cyclopentene, cyclohexene, cyclooctene or nor-bornene, polyethylene (which optionally can be crosslinked), for example high density polyethylene (HDPE), high density and high molecular weight polyethylene (HDPEHMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated tempera-ture).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single-site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE), and mixtures thereof with low density polyethylene (LDPE), very low density polyethylene, propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example C5-C9) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included. Copolymers from 1.)-4.) may by random or block-copolymers, homo- or heterophasic, or High Crystalline Homopolymer.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives or mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/isoprene/butadiene/styrene, styrene/ethylene/butylene/styrene or styrene/ethylene/propylene/styrene, HIPS, ABS, ASA, AES.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorin-ated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers. Polyvinyl chloride may be rigid or flexible (plasticized).

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or poly-butadienes on the one hand and aliphatic or aromatic polyisocyanates on the other, as well as precursors thereof. Polyurethanes formed by the reaction of: (1) diisocyanates with short-chain diols (chain extenders) and (2) diisocyanates with long-chain diols (thermoplastic polyurethanes, TPU).

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems). The poylamides may be amorphous.

17. Polyureas, polyimides, polyamideimides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polypropylene terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutyl-enesuccinate/terephtalate, polybutyleneadipate/terephthalate, polytetramethyleneadipate/terephtalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly (hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate, polyethylene furanoate and polylactic acid (PLA) as well as corresponding polyesters modified with polycarbonates or MBS. The term "polylactic acid (PLA)" designates a homo-polymer of pre-ferably poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxy-valeric acid, 5-hydroxy-valeric acid, 6-hydroxy-caproic acid and cyclic forms thereof; the terms "lactic acid" or "lactide" include L-lactic acid, D-lactic acid, mixtures and di-mers thereof, i.e. L-lactide, D-lactide, meso-lacide and any mixtures thereof. Preferred polyesters are PET, PET-G, PBT.

19. Polycarbonates and polyester carbonates. The polycarbonates are preferably prepared by reaction of bisphenol compounds with carbonic acid compounds, in particular phosgene or, in the melt transesterification process, diphenyl carbonate or dimethyl carbonate. Homopolycarbonates based on bisphenol A and copolycarbonates based on the monomers bisphenol A and 1,1-bis-(4-hydroxyphenyl)-3,3, 5-trimethylcyclohexane (bisphenol TMC) are particularly preferred. These and further bisphenol and diol compounds which can be used for the polycarbonate synthesis are disclosed inter alia in WO08037364 (p. 7, line 21 to p. 10, line 5), EP1582549 ([0018] to [0034]), WO02026862 (p. 2, line 23 to p. 5, line 15), WO05113639 (p. 2, line 1 to p. 7, line 20). The polycarbonates can be linear or branched. Mixtures of branched and unbranched polycarbonates can also be used. Suitable branching agents for polycarbonates are known from the literature and are described, for example, in patent specifications U.S. Pat. No. 4,185,009 and DE2500092 (3,3-bis-(4-hydroxyaryl-oxindoles according to the invention, see whole document in each case), DE4240313 (see p. 3, line 33 to 55), DE19943642 (see p. 5, line 25 to 34) and U.S. Pat. No. 5,367,044 as well as in literature cited therein. The polycarbonates used can additionally be intrinsically branched, no branching agent being added here within the context of the polycarbonate preparation. An example of intrinsic branchings are so-called Fries structures, as are disclosed for melt polycarbonates in EP1506249. Chain terminators can additionally be used in the polycarbonate preparation. Phenols such as phenol, alkylphenols such as cresol and 4-tert-butylphenol, chlorophenol, bromophenol, cumylphenol or mixtures thereof are preferably used as chain terminators. Polyester carbonates are obtained by reaction of the bisphenols already mentioned, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenone-dicarboxylic acids. A portion, up to 80 mol-%, preferably from 20 to 50 mol-%, of the carbonate groups in the polycarbonates can be replaced by aromatic dicarboxylic acid ester groups.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsatu-rated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine res-ins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A, bisphenol E and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and co-polymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

32. Adhesives, for example block copolymers such as SIS, SBS, SEBS, SEPS (S represents styrene, I isoprene, B polybutadiene, EB ethylene/butylene block, EP polyethylene/polypropylene block).

33. Rubbers, for example polymers of conjugated dienes, e.g. polybutadiene or polyisoprene, copolymers of mono- and diolefins with one another or with other vinyl monomers, copolymers of styrene or α-methylstyrene with dienes or with acrylic derivatives, chlorinated rubbers, natural rubber.

34. Elastomers, for example Natural polyisoprene (cis-1, 4-polyisoprene natural rubber (NR) and trans-1,4-polyisoprene gutta-percha), Synthetic polyisoprene (IR for isoprene rubber), Polybutadiene (BR for butadiene rubber), Chloroprene rubber (CR), polychloroprene, Neoprene, Baypren etc., Butyl rubber (copolymer of isobutylene and isoprene, IIR), Halogenated butyl rubbers (chloro butyl rubber: CIIR; bromo butyl rubber: BIIR), Styrene-butadiene Rubber (copolymer of styrene and butadiene, SBR), Nitrile rubber (copolymer of butadiene and acrylonitrile, NBR), also called Buna N rubbers Hydrogenated Nitrile Rubbers (HNBR) Therban and Zetpol, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VIM), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA), Thermoplastic elastomers (TPE), The proteins resilin and elastin, Polysulfide rubber, Elastolefin, elastic fiber used in fabric production.

35. Thermoplastic elastomers, for example Styrenic block copolymers (TPE-s), Thermoplastic olefins (TPE-o), Elastomeric alloys (TPE-v or TPV), Thermoplastic polyurethanes (TPU), Thermoplastic copolyester, Thermoplastic polyamides, Reactor TPO's (R-TPO's), Polyolefin Plastomers (POP's), Polyolefin Elastomers (POE's).

The shaped artificial polymer article of the present invention is for example prepared by one of the following processing steps:

Injection blow molding, extrusion, blow molding, rotomolding, in mold decoration (back injection), slush molding, injection molding, co-injection molding, blow molding, forming, compression molding, resin transfer molding, pressing, film extrusion (cast film; blown film), fiber spinning (woven, non-woven), drawing (uniaxial, biaxial), annealing, deep drawing, calandering, mechanical transformation, sintering, coextrusion, lamination, crosslinking (radiation, peroxide, silane), vapor deposition, weld together, glue, vulcanization, thermoforming, pipe extrusion, profile extrusion, sheet extrusion; sheet casting, strapping, foaming, recycling/rework, visbreaking (peroxide, thermal), fiber melt blown, spun bonded, surface treatment (corona discharge, flame, plasma), sterilization (by gamma rays, electron beams), tape extrusion, pulltrusion, SMC-process or plastisol.

Thus, a further embodiment of the present invention is an extruded, molded or calendered shaped artificial polymer article.

Examples of articles according to the present invention are:

I-1) Floating devices, marine applications, pontoons, buoys, plastic lumber for decks, piers, boats, kayaks, oars, and beach reinforcements.

I-2) Automotive applications, interior applications, exterior applications, in particular trims, bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof, door medallion, consoles, instrument panels, seats, frames, skins, automotive applications reinforced, automotive applications fiber reinforced, automotive applications with filled polymers, automotive applications with unfilled polymers.

I-3) Road traffic devices, in particular sign postings, posts for road marking, car acces-sories, warning triangles, medical cases, helmets, tires.

I-4) Devices for transportation or public transportation. Devices for plane, railway, motor car (car, motorbike), trucks, light trucks, busses, trams, bikes including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (per-sonal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, closets, wardrobes, dividing walls, slat walls, folding walls, roofs, shutters (e.g. roller shutters), fittings, connections between pipes, sleeves, and conveyor belts.

III-3) Sanitary articles, in particular mobile toilets, shower cubicles, lavatory seats, covers, and sinks.

III-4) Hygienic articles, in particular diapers (babies, adult incontinence), feminine hy-giene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes), cladding and siding.

III-7) Glass substitutes, in particular extruded plates, glazing for buildings (monolithic, twin or multiwall), aircraft, schools, extruded sheets, window film for architectural glaz-ing, train, transportation and sanitary articles.

III-8) Plates (walls, cutting board), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotex-tiles/monofilaments; filters; wipes/curtains (shades)/medical applications), bulk fibers (applications such as gown/protection clothes), nets, ropes, cables, strings, cords, threads, safety seatbelts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, geomembranes, tunnels, dumps, ponds, walls roofing membranes, geomembranes, swimming pools, swimming pool liners, pool liners, pond liners, curtains (shades)/sun-shields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V-1) Films (packaging, rigid packaging, dump, laminating, bale wrap, swimming pools, waste bags, wallpaper, stretch film, raffia, desalination film, batteries, and connectors.

V-2) Agricultural films (greenhouse covers, tunnel, multi-tunnel, micro-tunnel, "raspa y amagado", multi-span, low walk-in tunnel, high tunnel, mulch, silage, silo-bags, silo-stretch, fumigation, air bubble, keder, solawrap, thermal, bale wrap, stretched bale wraps, nursery, film tubes), especially in presence of intensive application of agrochemicals; other agricultural applications (e.g. non-woven soil covers, nets (made of tapes, multi-filaments and combinations thereof), tarpaulins. Such an agricultural film can either be a mono-layer structure or a multi-layer structure, typically made of three, five or seven layers. This can lead to a film structure like A-B-A, A-B-C, A-B-C-B-A, A-B-C-B-D, A-B-C-D-C-B-A, A-A-B-C-B-A-A. A, B, C, D represent the different polymers and tackifiers. However adjacent layers can also be coupled so that the final film article can be made of an even number of layers, i.e. two, four or six layers such as A-A-B-A, A-A-B-B, A-A-B-A-A, A-B-B-A-A, A-A-B-C-B, A-A-B-C-A-A and the like.

V-3) Tapes

V-4) Foams (sealing, insulation, barrier), sport and leisure mats.

V-5) Sealants

VI-1) Food packing and wrapping (flexible and solid), BOPP, BOPET, bottles.

VI-2) Storage systems such as boxes (crates), luggage, chest, household boxes, pal-lets, container, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office sup-plies of any kind (ball-point pens, stamps and ink-pads, mouse, shelves, tracks), bot-tles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, TiO2, mica, nanocomposites, dolomite, silicates, glass, asbestos).

A shaped artificial polymer article which is a film, pipe, cable, tape, sheet, container, frame, fibre or monofilament is preferred.

Another preferred embodiment of the present invention is a thin film, typically obtained with the blow extrusion technology. A monolayer film or a multilayer film of three, five or seven layers is of particular interest. The most important application of thin plastic films in agriculture is as covers for greenhouses and tunnels to grow crops in a protected environment.

A further embodiment of the present invention is an extruded, molded or calendered polymer composition comprising
(1) a synthetic polymer and/or an elastomer, and
(2) an ultraviolet radiation absorbing composition which comprises the compound of the general formula (I).

The ultraviolet radiation absorbing composition, in particular the compound of the general formula (I), is preferably present in the extruded, molded or calendered polymer composition in an amount of from 0.001% to 10%, preferably 0.005% to 5%, in particular 0.005% to 2%, by weight, relative the weight of the extruded, molded or calendered polymer composition.

The extruded, molded or calendered polymer composition may comprise at least one further additive in an amount of from 0.001% to 10%, preferably 0.005% to 5%, in particular 0.005% to 2%, by weight, relative to the weight of the extruded, molded or calendered polymer composition. Examples are listed below:

1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1'-yl)phenol, 2,4-dimethyl-6-(1'-methylheptadec-1'-yl)phenol, 2,4-di methyl-6-(1'-methyltridec-1'-yl)phenol and mixtures thereof.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.
1.4. Tocopherols, for example α-tocopherol, β-tocopherol, γ-tocopherol, δ-tocopherol and mixtures thereof (vitamin E).
1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.
1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methyl phenyl)butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methyl phenyl)pentane.
1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.
1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.
1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-d i-tert-butyl-4-hydroxyphenoxy)-1,3,5-triazine, 2,4,6-tris(3,5-d i-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.
1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.
1.12. Acylaminophenols, for example 4-hydroxylauranilide, 4-hydroxystearanilide, octyl N-(3,5-ditert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N, N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N, N'-bis(3,5-di-tert-butyl-4-hydroxyphenyl propionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-(2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-yl phenyl, 2[2'-hydroxy-3'-(α,α-dimethylbenzyl)-5'-(1,1,3,3-tetramethylbutyl)-phenyl]benzotriazole; 2[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-6,6-diphenylacrylate, isooctyl α-cyano-6,6-diphenylacrylate, methyl a-carbomethoxycinnamate, methyl α-cyano-6-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-13,13-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butyl-benzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example carbonic acid bis(1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypipendine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine,

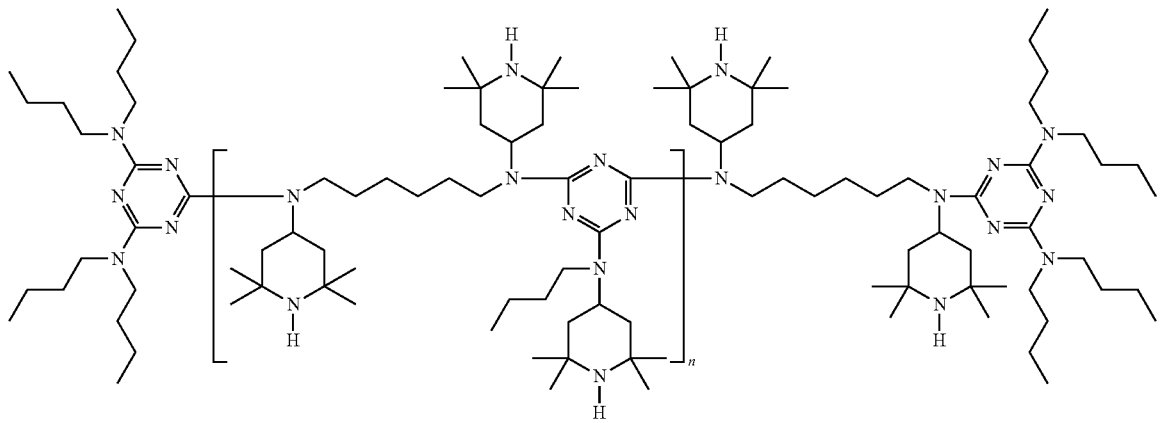

(Chimassorb®2020)

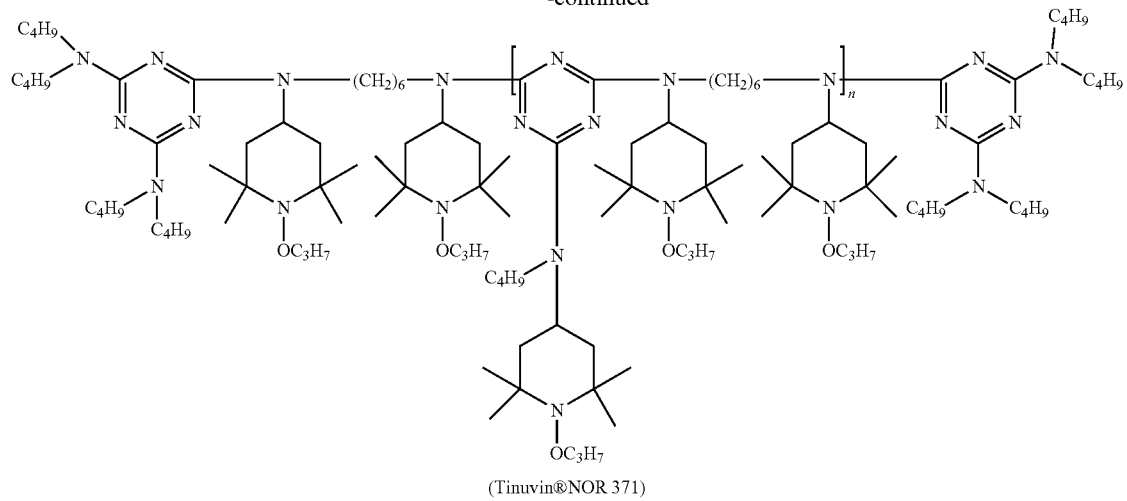

(Tinuvin®NOR 371)

1,3,5-Triazine-2,4,6-triamine, N,N'''-1,6-hexanediylbis[N',N''-dibutyl-N,N',N''-tris(2,2,6,6-tetramethyl-4-piperidinyl)- reaction products with 3-bromo-1-propene, oxidized, hydrogenated, 1,3,5-Triazine-2,4,6-triamine, N,N'''-1,6-hexanediylbis[N',N''-dibutyl-N,N',N''-tris(2,2,6,6-tetramethyl-4-piperidinyl)- and combinations thereof.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methyl phenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-di phenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, 2-(4,6-bis-biphenyl-4-yl-1,3,5-triazin-2-yl)-5-(2-ethyl-(n)-hexyloxy)phenol.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tertbutyl-12-methyl-dibenz[d,g]-1,3,2-dioxaphosphocin, 2,2',2"-nitrilo[triethyltris(3,3',5,5'-tetra-tertbutyl-1,1'-biphenyl-2,2'-diyl)phosphite], 2-ethyl hexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (CAS No. 939402-02-5), Phosphorous acid, triphenyl ester, polymer with alpha-hydro-omega-hydroxypoly[oxy(methyl-1,2-ethanediyl)], 010-16 alkyl esters (CAS No. 1227937-46-3).

The following phosphites are especially preferred:

Tris(2,4-di-tert-butylphenyl) phosphite (Irgafos® 168, Ciba Specialty Chemicals Inc.), tris(nonylphenyl) phosphite, (A)
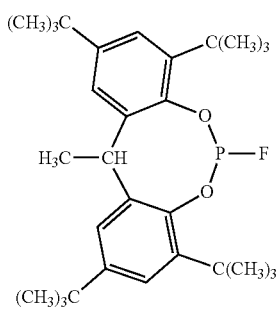

(B)
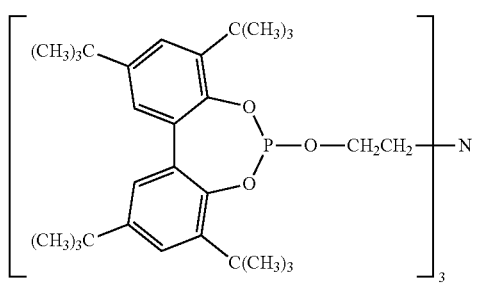

(C)
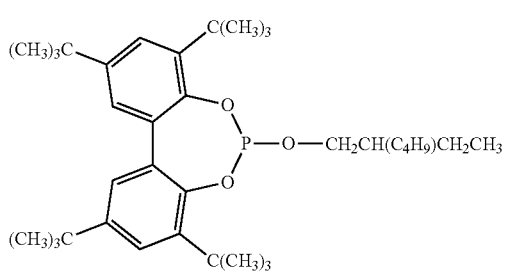

(D)
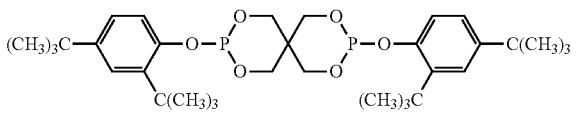

(E)
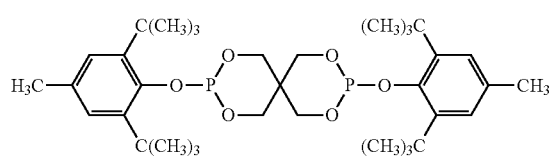

(F)
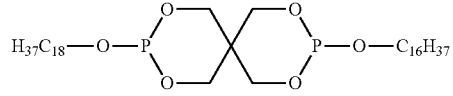

(G)
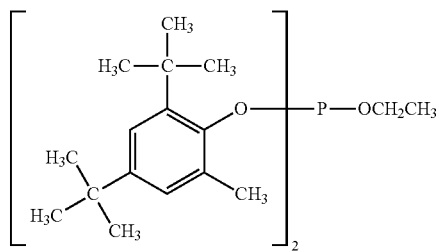

5. Hydroxylamines, for example N,N-dibenzylhydroxylamine, N,N-diethylhydroxylamine, N,N-di-octylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, Noctadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate, pentaerythritol tetrakis[3-(dodecylthio)propionate] or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. PVC heat stabilizer, for example, mixed metal stabilizers (such as Barium/Zinc, Calcium/Zinc type), Organotin stabilizers (such as organo tin mercaptester, -carboxylate, -sulfide), Lead stabilizers (such as Tribasic lead sulfate, Dibasic lead stearate, Dibasic lead phthalate, Dibasic lead phosphate, lead stearate), organic based stabilizers and combinations thereof.

12. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

13. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

14. Plasticizer, wherein said plasticizer is selected from the group consisting of Di(2-ethylhexyl) phthalate, Disonnyl phthalate, Diisodecyl phthalate, Dipropylheptyl phthalate, Trioctyl trimellitate, Tri(isononyl) trimellitate, epoxidized soy bean oil, Di(isononyl) cyclohexane-1,2-dicarboxylate, 2,4,4-Trimethyl-1,3-pentaediol diisobutyrate.

The plasticizer as used in accordance with the invention may also comprise one selected from the group consisting of: phthalates, trimellitates, aliphatic dibasic esters, polyesters, polymeric, epoxides, phosphates. In a preferred embodiment said plasticizer is selected from the group consisting of: Butyl benzyl phthalate, Butyl 2-ethylhexyl phthalate, Diisohexyl phthalate, Diisoheptyl phthalate, Di(2-ethylhexyl) phthalate, Diisooctyl phthalate, Di-n-octyl phthalate, Disononyl phthalate, Diisodecyl phthalate, Diiso undecyl phthalate, Diisotredecyl phthalate, Diiso (C11, C12, C13) phthalate, Di(n-butyl) phthalate, Di(n-C7, C9) phthalate, Di(n-C6, C8, C10) phthalate, Diiso(n-nonyl) phthalate, Di(n-C7, C9, C11) phthalate, Di(n-C9, C11) phthalate, Di(n-undecyl) phthalate, Tri(n-C8, C10) trimellitate, Tri(2-ethylhexyl) trimellitate, Tri(isooctyl) trimellitate, Tri(isononyl) trimellitate, Di(n-C7, C9) adipate, Di(2-ethylhexyl) adipate, Di(isooctyl) adipate, Di(isononyl) adipate, Polyesters of adipinic acid or glutaric acid and propylene glycol or butylene glycol or 2,2-dimethyl-1,3-propanediol, Epoxidized oils such as epoxidized soy bean oil, epoxidized linseed oil, epoxidized tall oil, Octyl epoxy tallate, 2-ethylhexyl epoxy tallate, Isodecyl diphenyl phosphate, Tri(2-ethylhexyl) phosphate, Tricresyl phosphate, Di(2-ethylhexyl) terephthalate, Di(isononyl) cyclohexane-1,2-dicarboxylate and combinations thereof. In a particularly preferred embodiment said plasticizer is selected from the group consisting of: Diisohexyl phthalate, Diisoheptyl phthalate, Di(2-ethylhexyl) phthalate, Diisooctyl phthalate, Di-n-octyl phthalate, Disononyl phthalate, Diisodecyl phthalate, Diiso undecyl phthalate, Diisotredecyl phthalate, Diiso (C11, C12, C13) phthalate, Di(n-butyl) phthalate, Di(n-C7, C9) phthalate, Di(n-C6, C8, C10) phthalate, Diiso (n-nonyl) phthalate, Di(n-C7, C9, C11) phthalate, Di(n-C9, C11) phthalate, Di(n-undecyl) phthalate, Tri(n-C8, C10) trimellitate, Tri(2-ethylhexyl) trimellitate, Tri(isooctyl) trimellitate, Tri(isononyl) trimellitate, Di(n-C7, C9) adipate, Di(2-ethylhexyl) adipate, Di(isooctyl) adipate, Di(isononyl) adipate, Polyesters of adipinic acid or glutaric acid and propylene glycol or butylene glycol or 2,2-dimethyl-1,3-propanediol, Epoxidized oils such as epoxidized soy bean oil, Di(isononyl) cyclohexane-1,2-dicarboxylate and combinations thereof.

15. Other additives, for example plasticisers, lubricants, emulsifiers, pigments, rheology additives, catalysts, flow-control agents, optical brighteners, flameproofing agents, antistatic agents and blowing agents.

16. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-d i-tert-butylbenzofuran-2-one, 3-(2-acetyl-5-isooctylphenyl)-5-isooctyl benzofuran-2-one.

With regard to the definition of the ultraviolet radiation absorbing composition comprising the compound of the general formula (I) reference is made to the statements provided above when discussing the technical details of the use of the ultraviolet radiation absorbing composition comprising the compound of the general formula (I).

The scope and interest of the invention will be better understood based on the following examples which are intended to illustrate certain embodiments of the invention and are non-limitative.

EXAMPLES

It is appreciated that all methods described in the following can be analogously applied to other compounds according to the invention.

Methods

Determination of 3-(2H-benzotriazol-2-yl)-5-(1,1-dimethylethyl)-4-hydroxy-benzenepropanoic acid and 3-(2H-benzotriazol-2-yl)-5-(1,1-dimethylethyl)-4-hydroxy-benzenepropanoic acid methyl ester by HPLC Operation range: The concentration of both compounds can be determined from 0.02%-10% w/w %.

Solvents: Water HPLC-quality, acetonitrile HPLC-quality, tetrahydrofurane HPLC-quality, tetrabutyl ammonium hydrogensulfate (TBAHS) HPLC-quality Column: Eclipse XDB C8 4.6*150 mm 5 μm Mobile phase A: Water-acetonitrile 9:1+TBAHS 2 g/l Mobile phase B: Acetonitrile-tetrahydrofurane 1:1

Flow: 1.1 ml/min

Injection volume: 10 μl

Oven temperature: 50° C.

Detection wavelength: 302 nm

| Gradient | Time [min] | A [%] | B [%] |
| --- | --- | --- | --- |
|  | 0 | 50 | 50 |
|  | 15 | 2 | 98 |
|  | 20 | 2 | 98 |
|  | 21 | 50 | 50 |
| Post Time | 5 |  |  |

Calibration: The quantification was carried out by means of a single point calibration. About 10 mg of acid ester was weighted in a 100 ml brown volumetric flask and filled up with tetrahydrofurane. The sample was dissolved in an ultrasonic bath for about 5 min and the solution was analyzed. This solution was diluted 1:10 with THF.

Hydrolysis of Ultraviolet Radiation Absorbing Compositions 100 mg of the ultraviolet radiation absorbing composition was dissolved in 100 ml of a solvent mixture (70 parts THF/30 parts 0.1 N NaOH) and 2-3 drops of water were added. The sample must be completely dissolved, otherwise a few drops of water have to be added. The mixture was heated at 50° C. for 2 h in a drying cabinet. After cooling to room temperature, 1 ml of this solution was transferred to a 100 ml volumetric flask and filled up with THF. The content of 3-(2H-benzotriazol-2-yl)-5-(1,1-dimethylethyl)-4-hydroxy-benzenepropanoic acid was analyzed by HPLC.

Amount of Covalently Bound Chromophore:

The amount of chromophore was calculated as w/w % of 3-(2H-benzotriazol-2-yl)-5-(1,1-dimethylethyl)-4-hydroxy-benzene-propanoic acid.

The amount of covalently bound chromophore was determined as follows:

HPLC Analysis of the Reaction Product (Determination of the Unbound Chromophore)

| Compound | % |
|---|---|
| 3-(2H-benzotriazol-2-yl)-5-(1,1-dimethylethyl)-4-hydroxy-benzene-propanoic acid methyl ester | A |
| 3-(2H-benzotriazol-2-yl)-5-(1,1-dimethylethyl)-4-hydroxy-benzene-propanoic acid | E |
| Sum | S |

HPLC Analysis of the Completely Hydrolyzed Reaction Product (Determination of the Unbound and Bound Chromophore)

| Compound | % |
|---|---|
| 3-(2H-benzotriazol-2-yl)-5-(1,1-dimethylethyl)-4-hydroxy-benzene-propanoic acid | C |

Amount of Covalently Bound Chromophore T (%):

$$T = C - (A+E) = C - S$$

Determination of E (1%/1 cm) at 343 nm-344 nm by UV Spectroscopy:

Spectrophotometer Lamda 950S (or equivalent)
Cell Type: Quarz, 10 mm
Reference: 1.4-dioxane
Temperature: ca.25° C.
Solvent: 1.4-dioxane, spectrophotometric grade
Preparation of the test solutions: About 25 mg of sample was weighed with a precision balance into a 100.0 ml (Vs) volumetric flask. It was filled up to the mark with 1.4-dioxane. 10.0 ml (V) of this solution was diluted to 100.0 ml (Vf) with 1.4-dioxane. The absorbance of this solution was measured between 290 and 450 nm.
Calculation of E (1%/1 cm):
Weighing w=in mg
Total volume of stock solution Vs
Used volume of stock solution V
Final volume of solution Vf
Cell d=10 mm
Wavelength maximum λ=343 nm
Measured absorbance at 343 nm A $$E(1\%, 1\ cm) = A_m \cdot \frac{Vs \cdot Vf * 10}{w \cdot V}$$

Determination of Methanol by Headspace GC-MS
Standard: Methanol
Solvents: 1,3-Dimethyl-2-imidazolidinone=DMI
Autosampler: Agilent G 1888 Headspace
Temperature: Oven: 100° C. loop: 110° C. transfer Line: 130° C.
Shaking: High
Pressure (psi): Carrier: 17.8 Vial: 13.0
Timing (minutes) Vial Equil.: 30.0
Pressure: 3.00
Loop Fill: 0.20
Loop Equil.: 0.05
Inject: 1.00
Gas Chromatograph: Agilent 6890
Injection technique: Split, 30 ml He/min.
Column: DB-VRX, film thickness 1.4 μm, 60 m×0.25 mm
Carrier gas: He, 1.0 ml/min
Temperatures: Injector: 220° C.
Oven: 2 min 50° C./10° C./min to 260° C./isothermal 15 min
Detector: Agilent 5973 Inert Mass Selective detector
EM Volts: 1718
Solvent Delay: 0.00; detector off: 15.0 min
SIM Modus: Component Ions, methanol 31
A standard calibration curve is generated by plotting the concentration of methanol vs. the peak area obtained.

$$y = mx + b$$

y=peak area
m=slope
x=concentration of methanol (mg/100 ml)
b=y intercept
x (mg/100 ml)=(y−b)/m Molecular Weight Distribution by GPC (Benzotriazole Polyglycerol Conjugates IE1-IE10)
Method: Gel Permeation Chromatography with RI-Detection
Standards: EasiVial GPC/SEC Calibration Standards PSS Part.No: PL2010-0201 Agilent
Solvents: Tetrahydrofurane HPLC quality, diethanolamine puriss p.a.
Apparatus: Malvern Viscotek with RI-Detector
Chromatography conditions: Column 1: PSS SDV 100 000 A, 8×300 mm, 5 u
Column 2: PSS SDV 1000 A, 8×300 mm, 5 u
Oven temperature: 40° C.
Mobile Phase: Tetrahydrofurane+3.7 g/L DEA
Flow: 1.0 ml/min
Sample concentration: approx. 2 mg/ml in the same solvent mixture as the mobile phase.
Calibration: Conventional calibration homopolymers.
Polystyrene reference samples.

Molecular Weight Distribution by GPC (Benzotriazole Polyglycerol Conjugates IE11, IE12)
Method: Gel Permeation Chromatography with RI-Detection
Standards: Polystyrene Reference Samples from Agilent
EasiVial GPC/SEC Calibration Standards Agilent Part.No: PL2010-0401 & PL2010-0402
Solvent: Tetrahydrofuran HPLC-Quality
Apparatus: Agilent with RI-Detector
Chromatography conditions:
Column: Column 1 Agilent PLgel 5 μm Mixed-D 300×7.5 mm
Column 2 Agilent PLgel 5 μm Mixed-D 300×7.5 mm Part.No. PL1110-6504
Column temperature: 30° C.
Mobile Phase: Tetrahydrofurane
Flow: 1.0 ml/min, Run time: 30 minutes, Injection volume: 50 μl, Calibration with polystyrene reference samples from Agilent: Polystyrene Low EasiVials Agilent Part N° PL2010-0401 and PL2010-0402
Sample preparation: Dissolve 25 mg of the compound in 10 ml THF. Samples should not be dissolved in an ultrasonic bath, but dissolved under shaking during one hour and allowed to stay one night in the dark prior to be filled in the vials.

Molecular Weight Distribution by GPC (Polyglycerols, Table 1)

Method: Gel Permeation Chromatography with RI-Detection

Standards: Poly(ethylene glycol), PSS-peg1k (PSS Polymer Standards Service GmbH, D-55120 Mainz, Germany)

Mobile Phase: water, 0.3 g/L $NaN_3$
Column 1: PSS Suprema, 8×300 mm, 5 u, 30 Ångström
Column 2: PSS Suprema, 8×300 mm, 5 u, 1000 Ångström
Column 3: PSS Suprema, 8×300 mm, 5 u, 1000 Ångström
Oven temperature: 30° C.
Flow: 1.0 ml/min
Injection volume: 50 µL Determination of Sn by Inductively Coupled Plasma Atomic Emission Spectrometry (ICP-AES)

The sample preparation was done by pressurized wet digestion in PTFE vessels: About 200 mg of the sample was treated with 3 ml $HNC_3$ at a temperature of about 150° C. for six hours and cooled down to room temperature. The obtained solution was diluted with deionized water to an end volume of 20 ml and directly measured by ICP-AES.

The calibration was done by external standard method with commercially available elemental standard solutions. As a typical apparatus a Varian Vista Pro ICP-AES or Agilent 5100 ICP-AES spectrometer can be used.

Specific wavelengths for evaluation: Sn, 189.924 nm for the quantitative evaluation as well as 133, 138, 143, 146 and 284 nm to check possible interferences.

Synthetic Procedure

1. Preparation of Polyglycerols

Different polyglycerols (or polyglycerol alkyl esters) may be prepared as described in WO 2002 036534, US 2002 0058781, JP 02172938 and U.S. Pat. No. 6,620,904. CaO, $Na_2CO_3$ or $Ca(OH)_2$ is used as catalyst. If necessary, glycerol, diglycerol and other low molecular fractions can be removed from the reaction product, e.g. by short path distillation in order to achieve a specific quality. The characterization of the polyglycerols is outlined in table 1.

Polygycerols (or polyglycerol alkyl esters) are also available from Lonza AG, Sakamoto Yakuhin Kogyo Co. Ltd., Spiga Nord S.p.A., Evonik Industries AG.

TABLE 1

Characterization of polyglycerols

| | Mn (GPC) [Da] | Mw (GPC) [Da] | Mw/Mn (GPC) |
|---|---|---|---|
| Polyglycerol-3 | 285 | 306 | 1.1 |
| Polyglycerol-6 | 352 | 739 | 2.1 |
| Polyglycerol-14-monostearate | 606 | 3167 | 5.2 |
| Polyglycerol-10 | 373 | 796 | 2.1 |
| Polyglycerol-14 | 435 | 982 | 2.3 |

2. Preparation of Ultraviolet Radiation Absorbing Polymer Compositions (UVRAP)

IE1: Transesterification Product of 3-(2H-benzotriazol-2-yl)-5-(1,1-dimethylethyl)-4-hydroxy-benzenepropanoic acid methyl ester with polyglycerol-14

3-(2H-benzotriazol-2-yl)-5-(1,1-dimethylethyl)-4-hydroxy-benzene-propanoic acid methyl ester (630.6 g) was charged into a glass reactor equipped with nitrogen inlet, dephlegmator (120° C.) and agitation. The temperature was set to 190° C. in order to melt the 3-(2H-benzotriazol-2-yl)-5-(1,1-dimethylethyl)-4-hydroxy-benzene-propanoic acid methyl ester. As soon as the 3-(2H-benzotriazol-2-yl)-5-(1,1-dimethylethyl)-4-hydroxy-benzene-propanoic acid methyl ester was completely melted, tin-(II)-2-ethylhexanoate (1.94 g) was added and the reactor was evacuated to 860 mbar. Polyglycerol-14 (204.05 g) was charged within 1 h, while maintaining a reaction temperature of 185-195° C. Methanol was distilled of. Thereafter the vacuum was reduced gradually to 5-8 mbar at 195° C. and the reaction mass was stirred for 64 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition (754 g) was obtained as a yellow to amber glassy solid. The further characterization is outlined in table 4.

IE2: Transesterification Product of 3-(2H-benzotriazol-2-yl)-5-(1,1-dimethylethyl)-4-hydroxy-benzenepropanoic acid methyl ester with polyglycerol-10

3-(2H-benzotriazol-2-yl)-5-(1,1-dimethylethyl)-4-hydroxy-benzene-propanoic acid methyl ester (630.5 g) was charged into a glass reactor equipped with nitrogen inlet, dephlegmator (120° C.) and agitation. The temperature was set to 176° C. in order to melt the 3-(2H-benzotriazol-2-yl)-5-(1,1-dimethylethyl)-4-hydroxy-benzene-propanoic acid methyl ester. As soon as the 3-(2H-benzotriazol-2-yl)-5-(1,1-dimethylethyl)-4-hydroxy-benzene-propanoic acid methyl ester was completely melted, tin-(II)-2-ethylhexanoate (1.82 g) was added and the reactor was evacuated to 860 mbar. Polyglycerol-10 (187.61 g) was charged within 1 h, while maintaining a reaction temperature of 185-195° C. Methanol was distilled of. Thereafter the vacuum was reduced gradually to 5-8 mbar at 195° C. and the reaction mass was stirred for 40 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, a yellow to amber glassy solid was obtained. 737 g of the crushed solid were dissolved in 512 g ethyl acetate and mixed with 560 g methanol to form an emulsion. The emulsion separated without further stirring in two layers (16 h). The lower layer was removed and transferred to a rotary evaporator. Solvent evaporation under vacuum/150° C. gave the product as a yellow to amber glassy solid (663 g). The further characterization is outlined in table 4.

The UV spectrum of the ultraviolet radiation absorbing composition (solvent dioxane) is shown in FIG. 1.

IE3: Esterification product of 3-(2H-benzotriazol-2-yl)-5-(1,1-dimethylethyl)-4-hydroxy-benzenepropanoic acid with polyglycerol-14-monostearate Polyglycerol-14-monostearate (253.41 g) was charged into a glass reactor equipped with nitrogen inlet, dephlegmator (120° C.) and agitation. Tin-(II)-2-ethylhexanoate (1.89 g) was added at 120° C. 3-(2H-benzotriazol-2-yl)-5-(1,1-dimethylethyl)-4-hydroxy-benzene-propanoic acid (682.5 g) was charged in portions into a glass reactor. The temperature was set to 175-195° C. in order to melt the 3-(2H-benzotriazol-2-yl)-5-(1,1-dimethylethyl)-4-hydroxy-benzene-propanoic acid.

Thereafter the vacuum was reduced gradually to 5-8 mbar at 195° C. and the reaction mass was stirred for 40 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a yellow to amber glassy solid. The further characterization is outlined in table 4.

IE4: Esterification product of 3-(2H-benzotriazol-2-yl)-5-(1,1-dimethylethyl)-4-hydroxy-benzenepropanoic acid with polyglycerol-14-monostearate Polyglycerol-14-monostearate (211.76 g) was charged into a glass reactor equipped with nitrogen inlet, dephlegmator (120° C.) and agitation. Tin-(II)-2-ethylhexanoate (1.87 g) was added at 183° C. 3-(2H-benzotriazol-2-yl)-5-(1,1-dimethylethyl)-4-hydroxy-benzene-propanoic acid (625.0 g) was charged in portions into a glass reactor. The temperature was set to 175-195° C. in order to melt the 3-(2H-benzotriazol-2-yl)-5-(1,1-dimethylethyl)-4-hydroxy-benzene-propanoic acid.

Thereafter the vacuum was reduced gradually to 5-8 mbar at 195° C. and the reaction mass was stirred for 40 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a yellow to amber glassy solid. The further characterization is outlined in table 4.

IE5: Esterification product of 3-(2H-benzotriazol-2-yl)-5-(1,1-dimethylethyl)-4-hydroxy-benzenepropanoic acid with polyglycerol-6

Polyglycerol-6 (40.6 g) was charged into a glass flask equipped with nitrogen inlet, dephlegmator (120° C.) and agitation. 3-(2H-benzotriazol-2-yl)-5-(1,1-dimethylethyl)-4-hydroxy-benzene-propanoic acid (48.1 g) was charged in portions into the glass flask at 105° C. Tin-(II)-2-ethylhexanoate (0.46 g) was added. The temperature was set to 130° C. in order to suspend the 3-(2H-benzotriazol-2-yl)-5-(1,1-dimethylethyl)-4-hydroxy-benzene-propanoic acid. Thereafter the vacuum was reduced gradually to 3 mbar at 104-132° C. and the reaction mass was stirred for 20 h at 126-132° C., and for 3 h at 126-163° C. until the concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.5%. The composition of the reaction mixture was monitored by HPLC. After cooling down to ambient temperature, the UV-absorbing polymer composition was obtained as a waxy solid (82.7 g). The further characterization is outlined in table 4.

IE6: Transesterification Product of 3-(2H-benzotriazol-2-yl)-5-(1,1-dimethylethyl)-4-hydroxy-benzenepropanoic acid methyl ester with polyglycerol-6

Polyglycerol-6 (20.06 g) was charged into a glass flask equipped with nitrogen inlet, dephlegmator (120° C.) and agitation. 3-(2H-benzotriazol-2-yl)-5-(1,1-dimethylethyl)-4-hydroxy-benzene-propanoic acid methyl ester (48.2 g) was charged in portions into the glass flask at 105° C. Tin-(II)-2-ethylhexanoate (0.56 g) was added. The temperature was set to 120° C. in order to suspend the 3-(2H-benzotriazol-2-yl)-5-(1,1-dimethylethyl)-4-hydroxy-benzene-propanoic acid methyl ester. Thereafter the vacuum was reduced gradually to 3-4 mbar at 150-194° C. (5 h) and the reaction mass was stirred for 16 h at 194° C., until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a waxy solid (63.0 g). The further characterization is outlined in table 4.

IE7: Transesterification Product of 3-(2H-benzotriazol-2-yl)-5-(1,1-dimethylethyl)-4-hydroxy-benzenepropanoic acid methyl ester with polyglycerol-6

Polyglycerol-6 (40.19 g) was charged into a glass flask equipped with nitrogen inlet, dephlegmator (120° C.) and agitation. 3-(2H-benzotriazol-2-yl)-5-(1,1-dimethylethyl)-4-hydroxy-benzene-propanoic acid methyl ester (48.3 g) was charged in portions into the glass flask at 136-142° C. Tin(II)-2-ethylhexanoate (0.53 g) was added. The temperature was set to 120-140° C. in order to dissolve the 3-(2H-benzotriazol-2-yl)-5-(1,1-dimethylethyl)-4-hydroxy-benzene-propanoic acid methyl ester. Thereafter the vacuum was reduced gradually to 3-5 mbar at 150-196° C. (5 h) and the reaction mass was stirred for 21 h at 193-196° C., until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.5%. The composition of the reaction mixture was monitored by HPLC. After cooling down to ambient temperature, the UV-absorbing polymer composition was obtained as a waxy solid (82.3 g). The further characterization is outlined in table 4.

IE8: Transesterification Product of 3-(2H-benzotriazol-2-yl)-5-(1,1-dimethylethyl)-4-hydroxy-benzenepropanoic acid methyl ester with polyglycerol-3

Polyglycerol-3 (40.2 g) was charged into a glass flask equipped with nitrogen inlet, dephlegmator (120° C.) and agitation. 3-(2H-benzotriazol-2-yl)-5-(1,1-dimethylethyl)-4-hydroxy-benzene-propanoic acid methyl ester (48.0 g) was charged in portions into the glass flask at 120-140° C. Tin(II)-2-ethylhexanoate (0.49 g) was added. The temperature was set to 130° C. in order to suspend the 3-(2H-benzotriazol-2-yl)-5-(1,1-dimethylethyl)-4-hydroxy-benzene-propanoic acid methyl ester. Thereafter the vacuum was reduced gradually to 3 mbar at 140-195° C. (3 h) and the reaction mass was stirred for 20 h at 180-195° C. until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a waxy solid (80 g). The further characterization is outlined in table 4.

IE9: Transesterification Product of 3-(2H-benzotriazol-2-yl)-5-(1,1-dimethylethyl)-4-hydroxy-benzenepropanoic acid methyl ester with polyglycerol-3

Polyglycerol-3 (20.1 g) was charged into a glass flask equipped with nitrogen inlet, dephlegmator (120° C.) and agitation. 3-(2H-benzotriazol-2-yl)-5-(1,1-dimethylethyl)-4-hydroxy-benzene-propanoic acid methyl ester (48.1 g) was charged in portions into the glass flask at 120-144° C. Tin(II)-2-ethylhexanoate (0.51 g) was added. The temperature was set to 130-145° C. in order to suspend the 3-(2H-benzotriazol-2-yl)-5-(1,1-dimethylethyl)-4-hydroxy-benzene-propanoic acid methyl ester. Thereafter the vacuum was reduced gradually to 3 mbar at 154-195° C. (3 h) and the reaction mass was stirred for 20 h at 180-195° C. until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition was obtained as a waxy solid (62 g). The further characterization is outlined in table 4.

IE10: Transesterification Product of 3-(2H-benzotriazol-2-yl)-5-(1,1-dimethylethyl)-4-hydroxybenzenepropanoic acid methyl ester with polyglycerol-3

Polyglycerol-3 (7.19 g) was charged into a glass flask equipped with nitrogen inlet, dephlegmator (120° C.) and agitation. 3-(2H-benzotriazol-2-yl)-5-(1,1-dimethylethyl)-4-hydroxy-benzene-propanoic acid methyl ester (48.25 g) was charged in portions into the glass flask at 120-140° C. Tin-(II)-2-ethylhexanoate (0.48 g) was added. The temperature was set to 140° C. in order to suspend the 3-(2H-benzotriazol-2-yl)-5-(1,1-dimethylethyl)-4-hydroxy-benzene-propanoic acid methyl ester. Thereafter the vacuum was reduced gradually to 3 mbar at 140-195° C. (3 h) and the reaction mass was stirred for 16 h at 180-195° C. until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 5.0%. The composition of the reaction mixture was monitored by HPLC. After cooling down to ambient temperature, the UV-absorbing polymer composition was obtained as a waxy solid (49.8 g). The further characterization is outlined in table 4.

IE11: Transesterification Product of 3-(2H-benzotriazol-2-yl)-5-(1,1-dimethylethyl)-4-hydroxybenzenepropanoic acid methyl ester with polyglycerol-14

3-(2H-benzotriazol-2-yl)-5-(1,1-dimethylethyl)-4-hydroxy-benzene-propanoic acid methyl ester (306.0 kg) was charged into a glass-lined steel reactor equipped with argon inlet, dephlegmator (120° C.) and agitation. The temperature was set to 195° C. in order to melt the 3-(2H-benzotriazol-2-yl)-5-(1,1-dimethylethyl)-4-hydroxy-benzene-propanoic acid methyl ester. As soon as the 3-(2H-benzotriazol-2-yl)-5-(1,1-dimethylethyl)-4-hydroxy-benzene-propanoic acid methyl ester was completely melted, the reactor was evacuated to 850 mbar and tin-(II)-2-ethylhexanoate (20.0 kg) is added. Molten polyglycerol-14 (105.0 kg) was charged within 1-2 h, while maintaining a reaction temperature of 185-190° C. Methanol was distilled of. Thereafter the vacuum was reduced gradually to 5-8 mbar at 195° C. and the reaction mass was stirred for 72 h until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, the UV-absorbing polymer composition (384 kg) was obtained as a yellow to amber glassy solid. The results of the HPLC analysis are shown in tables 2a and 2b. The further characterization is outlined in tables 3 and 4.

TABLE 2a

HPLC analysis of the reaction product (unbound chromophore)

| Compound | % |
| --- | --- |
| 3-(2H-benzotriazol-2-yl)-5-(1,1-dimethylethyl)-4-hydroxy-benzene-propanoic acid methyl ester | 0.1 |
| 3-(2H-benzotriazol-2-yl)-5-(1,1-dimethylethyl)-4-hydroxy-benzene-propanoic acid | 0.5 |
| Sum | 0.6 |

TABLE 2b

HPLC analysis of the completely hydrolyzed reaction product

| Compound | % |
| --- | --- |
| 3-(2H-benzotriazol-2-yl)-5-(1,1-dimethylethyl)-4-hydroxy-benzene-propanoic acid | 75.8 |

Amount of covalently bound chromophore: 75.8%−0.6%=75.2% (chromophore, determined as 3-(2H-benzotriazol-2-yl)-5-(1,1-dimethylethyl)-4-hydroxy-benzene-propanoic acid).

TABLE 3

Characterization of IE11

| UV | | Solubility | |
| --- | --- | --- | --- |
| | | Solvent | % |
| E 1%, 1 cm [λ = 344 nm] | 331 | | |
| Methanol [ppm] | 6 | C12-15 alkyl benzoate | >40 |
| $T_g$ [° C.] | 51.2 | Dibutyl adipate | >40 |
| Sn [ppm] | 150 | Dicaprylyl carbonate | >40 |
| Gardner color scale | 6.2 | | |

IE12: Transesterification Product of 3-(2H-benzotriazol-2-yl)-5-(1,1-dimethylethyl)-4-hydroxybenzenepropanoic acid methyl ester with polyglycerol-104 (Spiga)

3-(2H-benzotriazol-2-yl)-5-(1,1-dimethylethyl)-4-hydroxy-benzene-propanoic acid methyl ester (632.6 g) was charged into a glass reactor equipped with nitrogen inlet, dephlegmator (120 125° C.) and agitation. The temperature was set to 200° C. in order to melt the 3-(2H-benzo-tri-azol-2-yl)-5-(1,1-dimethylethyl)-4-hydroxy-benzene-propanoic acid methyl ester. As soon as the 3-(2H-benzotriazol-2-yl)-5-(1,1-dimethylethyl)-4-hydroxy-benzene-propanoic acid methyl ester was completely melted, tin-(II)-2-ethylhexanoate (0.79 g) was added. Polyglycerol-104 (607.0 g) was charged within 70 min, while maintaining a reaction temperature of 197-200° C.

The reaction mixture was stirred for 21 h at 200–225° C. (methanol was distilled of). Thereafter vacuum was applied (gradually to 7 mbar at 223° C.) and the reaction mass was stirred for 3.5 h, until the total concentration of 3-(2H-benzotriazol-2-yl)-5-(1,1-dimethylethyl)-4-hydroxy-benzene-propanoic acid methyl ester and 3-(2H-benzotriazol-2-yl)-5-(1,1-dimethylethyl)-4-hydroxy-benzene-propanoic acid was below 1.0%. The composition of the reaction mixture was monitored by HPLC. After cooling down to ambient temperature, a brown waxy solid was obtained (1156 g). The further characterization is outlined in table 4.

compounded in a twin-screw extruder Berstorff® ZE 25×32D at 230° C. under $N_2$ blanket. The full formulation is then injection molded at 230° C. on an Engel HL65 injection molding machine. The injection molded plaques (68 mm×44 mm×2 mm) are stored at elevated temperatures at 150° C. The parameters measured are stickiness according to PV1306, durability via 3-point bending test until embrittlement and color deviation (gray scale and Delta E*) and gloss at 60°.

The injection molded plaques are also exposed to artificial weathering according to Volkswagen Norm PV1306 (Stickiness Test) (Xenon light, irradiance 40 W/m²© 300-400 nm, black panel temperature 80° C., relative humidity 20%+/−10%) and Volkswagen Norm PV3930 (Florida Test) (Xenon light, irradiance 60 W/m²© 300-400 nm, black panel temperature 65° C., relative humidity 35-45%+/−5%). The parameters measured are stickiness according to PV1306, color deviation (gray scale and Delta E*) and gloss at 60°.

The inventive examples IE11 and IE12 show superior performance.

TABLE 4

Characterization of inventive examples IE1 to IE12

| Sample # | Reaction of benzotriazole | with polyglycerol | Weight ratio benzotriazole/polyglycerol | UV Spectrum E11 at 344 nm | % 5a (HPLC) | % 5b (HPLC) |
|---|---|---|---|---|---|---|
| IE12 | 5a | Polyglycerol-14 | 1:1 | 238 | 0.3 | 0.5 |
| IE11 | 5a | Polyglycerol-14 | 2.9:1 | 331 | 0.1 | 0.5 |
| IE10 | 5a | Polyglycerol-3 | 6.7:1 | 400 | 4.0 | 0.1 |
| IE9 | 5a | Polyglycerol-3 | 2.4:1 | 327 | 0.2 | 0.1 |
| IE8 | 5a | Polyglycerol-3 | 1.2:1 | 240 | 0.1 | <0.05 |
| IE7 | 5a | Polyglycerol-6 | 1.2:1 | 243 | 0.2 | 1.1 |
| IE6 | 5a | Polyglycerol-6 | 2.4:1 | 325 | 0.2 | 0.7 |
| IE5 | 5b | Polyglycerol-6 | 1.2:1 | 242 | 0.3 | 0.9 |
| IE4 | 5b | Polyglycerol-14-monostearate (Polyglycerin-14--stearate) | 2.95:1 | 352 | 0.04 | 0.3 |
| IE3 | 5b | Poloyglycerol-14-monostearate | 2.7:1 | 330 | 0.02 | 0.5 |
| IE2 | 5a | Polyglycerol-10 | 3.4:1 | 353 | 0.4 | 0.3 |
| IE1 | 5a | Polyglycerol-14 | 3.1:1 | 343 | 0.4 | 0.4 |

| Sample # | Mn (GPC) [Da] | Mw (GPC) [Da] | Mw/Mn (GPC) | Solubility at room temperature [%] | | | | | |
|---|---|---|---|---|---|---|---|---|---|
| | | | | Cetiol AB | Cetiol B | Cetiol CC | Xylol | Butylacetate | Butylglycol |
| IE12 | 927 | 1200 | 1.3 | <30 | <30 | <30 | nd | nd | nd |
| IE11 | 1465 | 1883 | 1.3 | >40 | >40 | >40 | >30 | >30 | >30 |
| IE10 | 977 | 1297 | 1.3 | >30 | >30 | >30 | >30 | >30 | >30 |
| IE9 | 261 | 630 | 2.4 | nd | >30 | nd | nd | >30 | >30 |
| IE8 | 143 | 381 | 2.7 | nd | nd | nd | nd | nd | >30 |
| IE7 | 219 | 679 | 3.1 | nd | nd | nd | >30 | nd | nd |
| IE6 | 478 | 1109 | 2.3 | >30 | >30 | >30 | >30 | >30 | >30 |
| IE5 | 193 | 551 | 2.9 | nd | nd | nd | >30 | nd | nd |
| IE4 | 1562 | 2219 | 1.4 | >30 | >30 | >30 | >30 | >30 | >30 |
| IE3 | 2144 | 3852 | 1.8 | >40 | >40 | >40 | >30 | >30 | >30 |
| IE2 | 1014 | 1867 | 1.8 | >40 | >40 | >40 | >30 | >30 | >30 |
| IE1 | 1070 | 2062 | 1.9 | >40 | >40 | >40 | >30 | >30 | >30 |

"nd" = not detectable
The molecular weight distribution (GPC) of samples IE1 to IE10 is determined according to a different method than that of samples IE 11 and IE12 as indicated above.

APPLICATION EXAMPLES

In the following example "%" and "parts" mean "% by weight" and parts by weight, respectively, unless indicated otherwise.
(RTM)=Registered Trade Mark Example 1: Aging of Thermoplastic Polyolefins Preparation of the Tested Specimen:
The components of the formulation listed in Tables 5a, 5b and 5c are pre-mixed in a high-speed mixer. This mixture is TABLE 5a PP/TPO plus additive components:

| Additive: | 1 [%] | 2 [%] | 3 [%] | 4 [%] | 5 [%] | 6 [%] | 7 [%] | 8 [%] | 9 [%] | 10 [%] |
|---|---|---|---|---|---|---|---|---|---|---|
| Erucamide | 0.00 | 0.40 | 0.40 | 0.40 | 0.40 | 0.40 | 0.40 | 0.40 | 0.40 | 0.40 |
| IE 11 | | | 0.15 | | | | 1.5 | | | |
| IE 12 | | | | 0.15 | | | | 1.5 | | |
| HALS 1 | | | 0.03 | 0.03 | 0.03 | 0.03 | 0.03 | 0.03 | 0.03 | 0.03 |
| HALS 2 | | | | | | | | | | |
| UVA 1 | | | | | | | | | 1.5 | |
| UVA 2 | | | | | 0.15 | | | | | 1.5 |
| UVA 3 | | | | | | | | | | |
| UVA 4 | | | | | | 0.15 | | | | |
| UVA 5 | | | | | | | | | | |
| UVA 6 | | | | | | | | | | |
| UVA 7 | | | | | | | | | | |
| UVA 8 | | | | | | | | | | |

TABLE 5b

PP/TPO plus additive components

| Additive: | 11 [%] | 12 [%] | 13 [%] | 14 [%] | 15 [%] | 16 [%] | 17 [%] | 18 [%] | 19 [%] | 20 [%] | 21 [%] | 22 [%] |
|---|---|---|---|---|---|---|---|---|---|---|---|---|
| Erucamide | | | | | | | | | | | | |
| IE 11 | | | 0.15 | | | | | | | | | |
| IE 12 | | | | 0.15 | | | | | | | | |
| HALS 1 | 0.03 | | 0.03 | 0.03 | | | | | | | | |
| HALS 2 | | 0.03 | | | | | | | | | | |
| UVA 1 | | | | | 0.15 | | | | | | | |
| UVA 2 | | | | | | 0.15 | | | | | | |
| UVA 3 | | | | | | | 0.15 | | | | | |
| UVA 4 | | | | | | | | 0.15 | | | | |
| UVA 5 | | | | | | | | | 0.15 | | | |
| UVA 6 | | | | | | | | | | 0.15 | | |
| UVA 7 | | | | | | | | | | | 0.15 | |
| UVA 8 | | | | | | | | | | | | 0.15 |

TABLE 5c

PP/TPO plus additive components

| Additive: | 23 [%] | 24 [%] | 25 [%] | 26 [%] | 27 [%] | 28 [%] | 29 [%] | 30 [%] | 31 [%] | 32 [%] | 33 [%] | 34 [%] |
|---|---|---|---|---|---|---|---|---|---|---|---|---|
| Erucamide | | | | | | | | | | | | |
| IE 11 | 0.15 | | | | | | | | | | 1.5 | |
| IE 12 | | 0.15 | | | | | | | | | | 1.5 |
| HALS 1 | | | | | | | | | | | | |
| HALS 2 | | | | | | | | | | | | |
| UVA 1 | | | 1.5 | | | | | | | | | |
| UVA 2 | | | | 1.5 | | | | | | | | |
| UVA 3 | | | | | 1.5 | | | | | | | |
| UVA 4 | | | | | | 1.5 | | | | | | |
| UVA 5 | | | | | | | 1.5 | | | | | |
| UVA 6 | | | | | | | | 1.5 | | | | |
| UVA 7 | | | | | | | | | 1.5 | | | |
| UVA 8 | | | | | | | | | | 1.5 | | |

PP/TPO=Borealis Daplen EE013AE®
Base stabilization for all formulations: 0.05% Calcium stearate+0.15% Irganox B 215®
Erucamide=Croda Crodamide ER-MB-GD®
HALS1=BASF Tinuvin 770®
HALS2=BASF Chimassorb 2020®
UVA 1=BASF Chimassorb 81®
UVA 2=BASF Tinuvin 234®
UVA 3=BASF Tinuvin 312®
UVA 4=BASF Tinuvin 326®
UVA 5=BASF Tinuvin PA 328®
UVA 6=BASF Tinuvin 1577®
UVA 7=BASF Tinuvin 1600®
UVA 8=BASF Tinuvin P®

Example 2: Aging of ABS

Preparation of the Tested Specimen:

The components of the formulation listed in Tables 6a, 6b, 6c and 6d are pre-mixed in a highspeed mixer. This mixture is compounded in a twin-screw extruder Berstorff® ZE 25×32D at 230° C. under $N_2$ blanket. The full formulation is then injection molded at 230° C. on an Engel HL65 injection molding machine. The injection molded plaques (68 mm×44 mm×2 mm) are stored at elevated temperatures at 80° C. The parameters measured are stickiness according to PV1306, durability via 3-point bending test until embrittlement and color deviation (gray scale and Delta E*) and gloss at 60°.

The injection molded plaques are also exposed to artificial weathering according to Volkswagen Norm PV1306 (Stickiness Test) (Xenon light, irradiance 40 W/m²© 300-400 nm, black panel temperature 80° C., relative humidity 20%+/−10%) and Volkswagen Norm PV3930 (Florida Test) (Xenon light, irradiance 60 W/m²© 300-400 nm, black panel temperature 65° C., relative humidity 35-45%+/−5%). The parameters measured are stickiness according to PV1306, color deviation (gray scale and Delta E*) and gloss at 60°.

The inventive examples IE11 and IE12 show superior performance.

TABLE 6a

ABS plus additive components

| Additive: | Sample No.: | | | | | | | | | | | |
|---|---|---|---|---|---|---|---|---|---|---|---|---|
| | 1 [%] | 2 [%] | 3 [%] | 4 [%] | 5 [%] | 6 [%] | 7 [%] | 8 [%] | 9 [%] | 10 [%] | 11 [%] | 12 [%] |
| IE 11 | | | | | | | | | | | 0.2 | |
| IE 12 | | | | | | | | | | | | 0.2 |
| HALS 1 | | 0.2 | 0.2 | 0.2 | 0.2 | 0.2 | 0.2 | 0.2 | 0.2 | 0.2 | 0.2 | 0.2 |
| HALS 2 | | | | | | | | | | | | |
| HALS 3 | | | | | | | | | | | | |
| UVA 1 | | | 0.2 | | | | | | | | | |
| UVA 2 | | | | 0.2 | | | | | | | | |
| UVA 3 | | | | | 0.2 | | | | | | | |
| UVA 4 | | | | | | 0.2 | | | | | | |
| UVA 5 | | | | | | | 0.2 | | | | | |
| UVA 6 | | | | | | | | 0.2 | | | | |
| UVA 7 | | | | | | | | | 0.2 | | | |
| UVA 8 | | | | | | | | | | 0.2 | | |

TABLE 6b

ABS plus additive components

| Additive: | Sample No.: | | | | | | | | | | |
|---|---|---|---|---|---|---|---|---|---|---|---|
| | 13 [%] | 14 [%] | 15 [%] | 16 [%] | 17 [%] | 18 [%] | 19 [%] | 20 [%] | 21 [%] | 22 [%] | 23 [%] |
| IE 11 | | | | | | | | | | 0.2 | |
| IE 12 | | | | | | | | | | | 0.2 |
| HALS 1 | | | | | | | | | | | |
| HALS 2 | | | | | | | | | | | |
| HALS 3 | 0.2 | 0.2 | 0.2 | 0.2 | 0.2 | 0.2 | 0.2 | 0.2 | 0.2 | 0.2 | 0.2 |
| UVA 1 | | 0.2 | | | | | | | | | |
| UVA 2 | | | 0.2 | | | | | | | | |
| UVA 3 | | | | 0.2 | | | | | | | |
| UVA 4 | | | | | 0.2 | | | | | | |
| UVA 5 | | | | | | 0.2 | | | | | |
| UVA 6 | | | | | | | 0.2 | | | | |
| UVA 7 | | | | | | | | 0.2 | | | |
| UVA 8 | | | | | | | | | 0.2 | | |

TABLE 6c

ABS plus additive components

Sample No.:

| Additive: | 24 [%] | 25 [%] | 26 [%] | 27 [%] | 28 [%] | 29 [%] | 30 [%] | 31 [%] | 32 [%] | 33 [%] |
|---|---|---|---|---|---|---|---|---|---|---|
| IE 11 | | | | | | | | | 1.2 | |
| IE 12 | | | | | | | | | | 1.2 |
| HALS 1 | 0.2 | 0.2 | 0.2 | 0.2 | 0.2 | 0.2 | 0.2 | 0.2 | 0.2 | 0.2 |
| HALS 2 | | | | | | | | | | |
| HALS 3 | | | | | | | | | | |
| UVA 1 | 1.2 | | | | | | | | | |
| UVA 2 | | 1.2 | | | | | | | | |
| UVA 3 | | | 1.2 | | | | | | | |
| UVA 4 | | | | 1.2 | | | | | | |
| UVA 5 | | | | | 1.2 | | | | | |
| UVA 6 | | | | | | 1.2 | | | | |
| UVA 7 | | | | | | | 1.2 | | | |
| UVA 8 | | | | | | | | 1.2 | | |

TABLE 6d

ABS plus additive components

Sample No.:

| Additive: | 34 [%] | 35 [%] | 36 [%] | 37 [%] | 38 [%] | 39 [%] |
|---|---|---|---|---|---|---|
| IE 11 | | 1.8 | | | | |
| IE 12 | | | 1.8 | | | |
| HALS 1 | 0.2 | 0.2 | 0.2 | 0.2 | 0.1 | |
| HALS 2 | | | | | 0.1 | 0.1 |
| HALS 3 | | | | | | 0.1 |
| UVA 1 | | | | | | |
| UVA 2 | | | | 0.9 | | |
| UVA 3 | | | | | | |
| UVA 4 | | | | | | |
| UVA 5 | | | | | | |
| UVA 6 | | | | | | |
| UVA 7 | | | | | | |
| UVA 8 | 1.8 | | | 0.9 | 0.2 | 0.2 |

ABS=Styrolution Terluran GP-22®
Base stabilization for all formulations: 0.15% BASF Irganox B 900®
HALS1=BASF Tinuvin 770®
HALS2=BASF Chimassorb 2020®
HALS3=BASF Uvinul 4050®
UVA 1=BASF Chimassorb 81®
UVA 2=BASF Tinuvin 234®
UVA 3=BASF Tinuvin 312®
UVA 4=BASF Tinuvin 326®
UVA 5=BASF Tinuvin PA 328®
UVA 6=BASF Tinuvin 1577®
UVA 7=BASF Tinuvin 1600®
UVA 8=BASF Tinuvin P®

Example 3: Aging of PC, PC/ABS or ABS/PC

Preparation of the Tested Specimen:

The components of the formulation listed in Tables 7a, 7b, 7c, 8a, 8b, 9a and 9b are pre-mixed in a high-speed mixer. This mixture is compounded in a twin-screw extruder Berstorff® ZE 25×32D at 230° C. under $N_2$ blanket. The full formulation is then injection molded at 230° C. on an Engel HL65 injection molding machine. The injection molded plaques (68 mm×44 mm×2 mm) are stored at elevated temperatures at 140° C. The parameters measured are stickiness according to PV1306, durability via 3-point bending test until embrittlement and color deviation (gray scale and Delta E*) and gloss at 60°.

The injection molded plaques are also exposed to artificial weathering according to Volkswagen Norm PV1306 (Stickiness Test) (Xenon light, irradiance 40 W/m²@ 300-400 nm, black panel temperature 80° C., relative humidity 20%+/−10%) and Volkswagen Norm PV3930 (Florida Test) (Xenon light, irradiance 60 W/m²© 300-400 nm, black panel temperature 65° C., relative humidity 35-45%+/−5%). The parameters measured are stickiness according to PV1306, color deviation (gray scale and Delta E*) and gloss at 60°.

The inventive examples IE11 and IE12 show superior performance.

TABLE 7a

PC plus additive components

Sample No.:

| Additive: | 1 [%] | 2 [%] | 3 [%] | 4 [%] | 5 [%] | 6 [%] | 7 [%] | 8 [%] | 9 [%] | 10 [%] |
|---|---|---|---|---|---|---|---|---|---|---|
| IE 11 | | | | | | | | | | |
| IE 12 | | | | | | | | | | |
| HALS 1 | | | | | | | | | 0.03 | |
| HALS 2 | | | | | | | | | | 0.03 |
| UVA 1 | | | | | | | | | | |
| UVA 2 | | | | | | | | | | |
| UVA 3 | | | | | | | | | | |
| UVA 4 | | | | | | | | | | |
| UVA 5 | | | | | | | | | | |
| UVA 6 | | | | | | | | | | |
| UVA 7 | | | | | | | | | | |

TABLE 7a-continued

PC plus additive components

| Additive: | 1 [%] | 2 [%] | 3 [%] | 4 [%] | 5 [%] | 6 [%] | 7 [%] | 8 [%] | 9 [%] | 10 [%] |
|---|---|---|---|---|---|---|---|---|---|---|
| UVA 8 | | | | | | | | | | |
| AO 1 | | 0.2 | | | | | | | | |
| AO 2 | | | 0.2 | | | | | 0.16 | 0.2 | 0.2 |
| AO 3 | | | | 0.1 | | | | | | |
| AO4 | | | | | 0.1 | | | | | |
| P 1 | | | | | | 0.1 | 0.1 | 0.2 | | |
| P 2 | | | | | | | | 0.04 | | |
| | | | | | | | | | | 15 |

TABLE 7b

PC plus additive components

| Additive: | 11 [%] | 12 [%] | 13 [%] | 14 [%] | 15 [%] | 16 [%] | 17 [%] | 18 [%] | 19 [%] | 20 [%] | 21 [%] | 22 [%] |
|---|---|---|---|---|---|---|---|---|---|---|---|---|
| IE 11 | | | | | | | | | | | 0.2 | |
| IE 12 | | | | | | | | | | | | 0.2 |
| HALS 1 | | | | | | | | | | | | |
| HALS 2 | | | | | | | | | | | | |
| UVA 1 | 0.2 | | | | | | | | | | | |
| UVA 2 | | 0.2 | | | | | | | | | | |
| UVA 3 | | | 0.2 | | | | | | | | | |
| UVA 4 | | | | 0.2 | | | | | | | | |
| UVA 6 | | | | | 0.2 | | | | | | | |
| UVA 7 | | | | | | 0.2 | | | | | | |
| UVA 8 | | | | | | | 0.2 | | | | | |
| UVA 9 | | | | | | | | 0.2 | | | | |
| UVA 10 | | | | | | | | | 0.2 | | | |
| UVA 11 | | | | | | | | | | 0.2 | | |
| AO 1 | | | | | | | | | | | | |
| AO 2 | 0.2 | 0.2 | 0.2 | 0.2 | 0.2 | 0.2 | 0.2 | 0.2 | 0.2 | 0.2 | 0.2 | 0.2 |
| AO 3 | | | | | | | | | | | | |
| AO4 | | | | | | | | | | | | |
| P 1 | | | | | | | | | | | | |
| P 2 | | | | | | | | | | | | |

TABLE 7c

PC plus additive components

| Additive: | 22 [%] | 23 [%] | 24 [%] | 25 [%] | 26 [%] | 27 [%] | 28 [%] |
|---|---|---|---|---|---|---|---|
| IE 11 | | | | | | 10 | |
| IE 12 | | | | | | | 10 |
| HALS 1 | | | | | | | |
| HALS 2 | | | | | | | |
| HALS 3 | | | | | | | |
| UVA 1 | | | | | | | |
| UVA 2 | | | | | | | |
| UVA 3 | | | | | | | |
| UVA 4 | | | | | | | |
| UVA 6 | | | | | | | |
| UVA 7 | | 10 | | | | | |
| UVA 8 | | | 10 | | | | |
| UVA 9 | 10 | | | | | | |
| UVA 10 | | | | 10 | | | |
| UVA 11 | | | | | 10 | | |
| AO 1 | | | | | | | |
| AO 2 | 0.2 | 0.2 | 0.2 | 0.2 | 0.2 | 0.2 | 0.2 |
| AO 3 | | | | | | | |
| AO4 | | | | | | | |
| P 1 | | | | | | | |
| P 2 | | | | | | | |

PC=Covestro Makrolon AL 247®
HALS1=BASF Tinuvin 770®
HALS2=BASF Chimassorb 2020®
UVA 1=BASF Chimassorb 81®
UVA 2=BASF Tinuvin 234®
UVA 3=BASF Tinuvin 312®
UVA 4=BASF Tinuvin 326®
UVA 6=BASF Tinuvin 1577®
UVA 7=BASF Tinuvin 1600®
UVA 8=BASF Tinuvin P®
UVA 9=BASF Tinuvin 360®

UVA 10=BASF Tinuvin 1600®
UVA 11=BASF Uvinul 3030®
AO 1=BASF Irganox B 215®
AO 2=BASF Irganox B 900®
AO 3=BASF Irganox 1076®
AO 4=BASF Irganox 3114®
P 1=BASF Irgafos 168®
P 2=BASF Irgafos 12®

TABLE 8a

ABS/PC plus additive components

| Additive: | 1 [%] | 2 [%] | 3 [%] | 4 [%] | 5 [%] | 6 [%] | 7 [%] | 8 [%] | 9 [%] | 10 [%] |
|---|---|---|---|---|---|---|---|---|---|---|
| IE 11  |     |     |     |     |     |     | 0.2 |     |     |     |
| IE 12  |     |     |     |     |     |     |     | 0.2 |     |     |
| HALS 3 |     |     |     |     |     |     |     |     | 0.1 |     |
| UVA 8  |     |     |     |     |     |     |     |     |     | 0.1 |
| UVA 9  |     |     |     | 0.2 |     |     |     |     |     |     |
| UVA 10 |     |     |     |     | 0.2 |     |     |     | 0.1 | 0.1 |
| UVA 11 |     |     |     |     |     | 0.2 |     |     |     |     |
| AO 1   |     | 0.2 |     |     |     |     |     |     |     |     |
| AO 2   |     |     | 0.2 | 0.2 | 0.2 | 0.2 | 0.2 | 0.2 | 0.2 | 0.2 |

TABLE 8b

ABS/PC plus additive components

| Additive: | 11 [%] | 12 [%] | 13 [%] |
|---|---|---|---|
| IE 11  |     | 1.0 |     |
| IE 12  |     |     | 1.0 |
| HALS 3 |     |     |     |
| UVA 8  |     |     |     |
| UVA 9  |     |     |     |
| UVA 10 |     |     |     |
| UVA 11 | 1.0 |     |     |
| AO 1   |     |     |     |
| AO 2   | 0.2 | 0.2 | 0.2 |

ABS/PC=Covestro Bayblend T 45®
HALS 3=BASF Uvinul 4050®
UVA 8=BASF Tinuvin P®
UVA 9=BASF Tinuvin 360®
UVA 10=BASF Tinuvin 1600®
UVA 11=BASF Uvinul 3030®
AO 1=BASF Irganox B 215®
AO 2=BASF Irganox B 900®

TABLE 9a

PC/ABS plus additive components

| Additive: | 1 [%] | 2 [%] | 3 [%] | 4 [%] | 5 [%] | 6 [%] | 7 [%] | 8 [%] | 9 [%] | 10 [%] |
|---|---|---|---|---|---|---|---|---|---|---|
| IE 11  |     |     |     |     |     |     | 0.2 |     |     |     |
| IE 12  |     |     |     |     |     |     |     | 0.2 |     |     |
| HALS 3 |     |     |     |     |     |     |     |     | 0.1 |     |
| UVA 8  |     |     |     |     |     |     |     |     |     | 0.1 |
| UVA 9  |     |     |     | 0.2 |     |     |     |     |     | 0.1 |
| UVA 10 |     |     |     |     | 0.2 |     |     |     | 0.1 |     |
| UVA 11 |     |     |     |     |     | 0.2 |     |     |     |     |
| AO 1   |     | 0.2 |     |     |     |     |     |     |     |     |
| AO 2   |     |     | 0.2 | 0.2 | 0.2 | 0.2 | 0.2 | 0.2 | 0.2 | 0.2 |

TABLE 9b

| | PC/ABS plus additive components | | |
|---|---|---|---|
| | Sample No.: | | |
| Additive: | 11 [%] | 12 [%] | 13 [%] |
| IE 11 | | 1.0 | |
| IE 12 | | | 1.0 |
| HALS 3 | | | |
| UVA 8 | | | |
| UVA 9 | | | |
| UVA 10 | 1.0 | | |
| UVA 11 | | | |
| AO 1 | | | |
| AO 2 | 0.2 | 0.2 | 0.2 |

ABS/PC=Covestro Bayblend T 65 XF®
HALS 1=BASF Tinuvin 770®
HALS 2=BASF Chimassorb 2020®
HALS 3=BASF Uvinul 4050®
UVA 8=BASF Tinuvin P®
UVA 9=BASF Tinuvin 360®
UVA 10=BASF Tinuvin 1600®
UVA 11=BASF Uvinul 3030®
AO 1=BASF Irganox B 215®
AO 2=BASF Irganox B 900®

Example 4: Aging of PET

Preparation of the Tested Specimen:

The components of the formulation listed in Tables 10a and 10b are pre-mixed in a high-speed mixer. This mixture is compounded in a twin-screw extruder Berstorff® ZE 25×32D at 260° C. under $N_2$ blanket. The full formulation is then injection molded at 230° C. on an Engel HL65 injection molding machine. The injection molded plaques (68 mm×44 mm×2 mm) are stored at elevated temperatures at 160° C. The parameters measured are stickiness according to PV1306, durability via 3-point bending test until embrittlement and color deviation (gray scale and Delta E*) and gloss at 60°.

The injection molded plaques are also exposed to artificial weathering according to Volkswagen Norm PV1306 (Stickiness Test) (Xenon light, irradiance 40 W/m²© 300-400 nm, black panel temperature 80° C., relative humidity 20%+/−10%) and Volkswagen Norm PV3930 (Florida Test) (Xenon light, irradiance 60 W/m²© 300-400 nm, black panel temperature 65° C., relative humidity 35-45%+/−5%). The parameters measured are stickiness according to PV1306, color deviation (gray scale and Delta E*) and gloss at 60°.

The inventive examples IE11 and IE12 show superior performance.

TABLE 10a

| | PET plus additive components | | | | | | | | | | | | |
|---|---|---|---|---|---|---|---|---|---|---|---|---|---|
| | Sample No.: | | | | | | | | | | | | |
| Additive: | 1 [%] | 2 [%] | 3 [%] | 4 [%] | 5 [%] | 6 [%] | 7 [%] | 8 [%] | 9 [%] | 10 [%] | 11 [%] | 12 [%] | 13 [%] |
| IE 11 | | | | | | | | | | | | | |
| IE 12 | | | | | | | | | | | | | |
| HALS 1 | | 0.2 | | 0.05 | | | | | | | | | |
| HALS 2 | | | 0.2 | | 0.05 | | | | | | | | |
| UVA 1 | | | | | | | 0.5 | | | | | | |
| UVA 2 | | | | 0.5 | 0.5 | | | 0.5 | | | | | |
| UVA 3 | | | | | | | | | 0.5 | | | | |
| UVA 4 | | | | | | | | | | 0.5 | | | |
| UVA 5 | | | | | | | | | | | 0.5 | | |
| UVA 6 | | | | | | | | | | | | 0.5 | |
| UVA 7 | | | | | | | | | | | | | 0.5 |
| UVA 8 | | | | | | 0.5 | | | | | | | |
| UVA 12 | | | | | | | | | | | | | |
| UVA 13 | | | | | | | | | | | | | |
| UVA 14 | | | | | | | | | | | | | |
| UVA 15 | | | | | | | | | | | | | |
| UVA 16 | | | | | | | | | | | | | |

TABLE 10b

| | PET plus additive components | | | | | | | | | | | | |
|---|---|---|---|---|---|---|---|---|---|---|---|---|---|
| | Sample No.: | | | | | | | | | | | | |
| Additive: | 14 [%] | 15 [%] | 16 [%] | 17 [%] | 18 [%] | 19 [%] | 20 [%] | 21 [%] | 22 [%] | 23 [%] | 24 [%] | 25 [%] | 26 [%] |
| IE 11 | 0.5 | | | | | | | | 1.0 | | | | |
| IE 12 | | 0.5 | | | | | | | | 1.0 | | | |
| HALS 1 | | | | | | | | | | | | | |
| HALS 2 | | | | | | | | | | | | | |
| UVA 1 | | | | | | | | | | | | | |
| UVA 2 | | | | | | | | | | | | | |
| UVA 3 | | | | | | | | | | | | | |
| UVA 4 | | | | | | | | | | | | | |

TABLE 10b-continued

PET plus additive components

| Additive: | 14 [%] | 15 [%] | 16 [%] | 17 [%] | 18 [%] | 19 [%] | 20 [%] | 21 [%] | 22 [%] | 23 [%] | 24 [%] | 25 [%] | 26 [%] | 26 [%] |
|---|---|---|---|---|---|---|---|---|---|---|---|---|---|---|
| UVA 5 | | | | | | | | | | | | | | |
| UVA 6 | | | | | | | | | | | 1.0 | | | |
| UVA 7 | | | | | | | | | | | | | | |
| UVA 8 | | | | | | | | | | | | | | |
| UVA 12 | | | 0.5 | | | | | | | | | | | |
| UVA 13 | | | | 0.5 | | | | | | | | | | |
| UVA 14 | | | | | | 0.5 | | | | | 1.0 | | | |
| UVA 15 | | | | | | | 0.5 | | | | | 1.0 | | |
| UVA 16 | | | | | | | | 0.5 | | | | | | 1.0 |

PET=Eastman VersaTray 12822®

Base stabilization for all formulations: 0.05% BASF Irganox 245®+0.1% BASF Irgafos 168®

HALS 1=BASF Tinuvin 770®
HALS 2=BASF Chimassorb 2020®
UVA 1=BASF Chimassorb 81®
UVA 2=BASF Tinuvin 234®
UVA 3=BASF Tinuvin 312®
UVA 4=BASF Tinuvin 326®
UVA 5=BASF Tinuvin PA 328®
UVA 6=BASF Tinuvin 1577®
UVA 7=BASF Tinuvin 1600®
UVA 8=BASF Tinuvin P®
UVA 12=BASF Tinuvin 928®
UVA 13=BASF Tinuvin 120®
UVA 14=Cytec Cyasorb UV-3638®
UVA 15=Clariant Hostavin PR-25®
UVA 16=Clariant Hostavin PR-31®

Example 5: Aging of Polyethylene Film

Preparation of the Tested Specimen:

The components of the formulation listed in Table 11 are pre-mixed in a high-speed mixer. This mixture is compounded in a twin-screw extruder OMC 19×25D at 200° C. The full formulation is then extruded to cast films at 220° C. on a Collin E 30 M 30×25D cast film machine to 120 micron thick films. The films are exposed to artificial weathering according to DIN EN ISO 4892-2 Cycle 1 (Xenon light, Boro/Boro-filter, irradiance 0.5 W/m² @ 340 nm, black panel temperature 65° C., relative humidity 65%+/−10%, 102 min wet/18 min dark cycle) and ASTM G154 Cycle 2 UV-B (Q-Panel, irradiance 0.78 W/m² @ 313 nm, black panel temperature 70° C. in light, black panel temperature 50° C. dark). The parameters measured are time until carbonyl index increase 0.1 units and retained elongation.

The inventive examples IE11 shows superior performance.

TABLE 11

LDPE plus additive components

| Additive: | 1 [%] | 2 [%] | 3 [%] | 4 [%] | 5 [%] | 6 [%] | 7 [%] | 8 [%] | 9 [%] | 10 [%] | 11 [%] |
|---|---|---|---|---|---|---|---|---|---|---|---|
| IE 11 | | | 0.05 | 0.05 | 0.25 | 0.5 | | | | | |
| HALS 2 | 0.07 | 0.02 | | 0.02 | 0.02 | 0.02 | 0.02 | 0.02 | 0.02 | 0.02 | 0.02 |
| UVA 1 | | | | | | | | | | 0.05 | |
| UVA 4 | | | | | | | 0.05 | 0.25 | 0.5 | | |
| UVA 7 | | | | | | | | | | | 0.05 |

LDPE = Versalis Riblene FC 30 (RTM)
HALS 2 = BASF Chimassorb 2020 (RTM)
UVA 1 = BASF Chimassorb 81 (RTM)
UVA 4 = BASF Tinuvin 326 (RTM)
UVA 7 = BASF Tinuvin 1600 (RTM)

Example 6: Aging of Plasticized PVC Sheet

Preparation of the Tested Specimen:

200 g of a CA/Zn PVC pre-blend is mixed with the additives listed in Table 12 for 20 min in a Rhoenrad mixed. 200 g of this mixture is calendered on a two roll mill (Schwabenthan D-1) and homogenized at 150-160° C. for 7 min. 400 micron thick sheets are prepared. The sheets are exposed to artificial weathering according to DIN EN ISO 4892-2 Cycle 1 (Xenon light, Boro/Boro-filter, irradiance 0.5 W/m$^2$© 340 nm, black panel temperature 65° C., relative humidity 65%+/−10%, 102 min wet/18 min dark cycle) and ASTM G154 Cycle 2 UV-B (Q-Panel, irradiance 0.78 W/m$^2$© 313 nm, black panel temperature 70° C. in light, black panel temperature 50° C. dark). The parameters measured are tensile strength and color deviation (YI and Delta E*).

The inventive examples IE11 and IE12 show superior performance.

TABLE 12

Plasticized PVC plus additive components

| Additive: | Sample No.: | | | | |
|---|---|---|---|---|---|
| | 1 [parts] | 2 [parts] | 3 [parts] | 4 [parts] | 5 [parts] |
| Ca/Zn PVC pre-blend | 100 | 100 | 100 | 100 | 100 |
| IE 11 | | 0.25 | | | |
| IE 12 | | | 0.25 | | |
| HALS 4 | | 0.25 | 0.25 | 0.25 | 0.25 |
| UVA 1 | | | | 0.25 | |
| UVA 5 | | | | | 0.25 |

Ca/Zn PVC pre-blend = 64.73% NORVINYL S7060 (RTM)/32.36% Palatinol N (RTM)/ 1.61% Drapex 39 (RTM)/1.30% Baerostab CT9063 (RTM)
HALS 4 = Octadecanoic acid, methyl ester, reaction products with 1-(2-hydroxy-2-methylpropoxy)-2,2,6,6-tetramethyl-4-piperidinol
UVA 1 = BASF Chimassorb 81 (RTM)
UVA 5 = BASF Tinuvin 328 (RTM)

Example 7: Aging of Rotomolded PE Plaques

Preparation of the Tested Specimen:

The components of the formulation listed in Table 13 are pre-mixed in a high-speed mixer. This mixture is compounded in a Leistritz 25 mm co-rotating extruder at 230° C. The received pellets are ground with 35 mesh Reduction Grinder. The full formulation is then rotomolded at max 240° C. on an LRM 1000 STP Rotomachinery. Plaques are cut out. The plaques are exposed to artificial weathering according to ASTM G-155A. Additional the migration out of the plaques into a food simulant is tested. The parameters measured are impact strength, color deviation (YI and Delta E*) and extraction into food simulant.

The inventive examples IE11 and IE12 show superior performance.

TABLE 13

LDPE plus additive components

| Additive: | Sample No.: | | | | |
|---|---|---|---|---|---|
| | 1 [%] | 2 [%] | 3 [%] | 4 [%] | 5 [%] |
| IE 11 | | 0.03 | | | |
| IE 12 | | | 0.03 | | |

TABLE 13-continued

LDPE plus additive components

| Additive: | Sample No.: | | | | |
|---|---|---|---|---|---|
| | 1 [%] | 2 [%] | 3 [%] | 4 [%] | 5 [%] |
| HALS 2 | | 0.12 | 0.12 | 0.12 | 0.12 |
| UVA 4 | | | | | 0.03 |

LDPE base stabilization for all formulations: 0.035% BASF Irganox 3114 (RTM) + 0.12% BASF Irgafos 168 (RTM) + 0.05% BASF Irgastab FS-042 (RTM) + 0.04% BASF Hycite 713 (RTM) + 0.02% Zinc Stearate
HALS 2 = BASF Chimassorb 2020 (RTM)
UVA 4 = BASF Tinuvin 326 (RTM)

The invention claimed is:

1. A method of stabilizing a shaped artificial polymer article to light, the method comprising:
   combining with the article an ultraviolet radiation absorbing composition,
   wherein the polymer is a synthetic polymer and/or a natural elastomer, and
   wherein the ultraviolet radiation absorbing composition comprises a compound of formula (I)

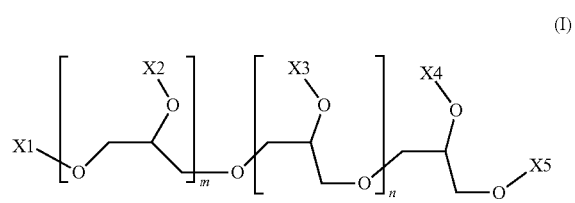

wherein
n and m are independently a number in a range of from 0 to 20, at least one of m and n being ≥1,
X1, X2, X3, X4, and X5 are independently H, C(O)R1, or a group of formula (II)

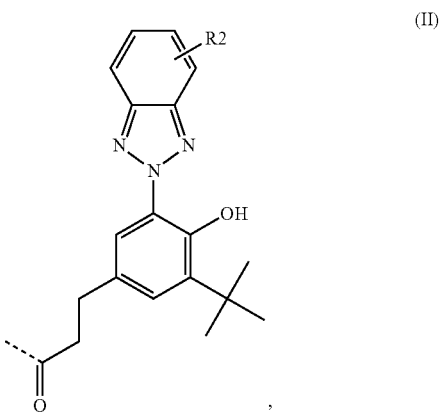

wherein R1 is $C_8$-$C_{24}$-alkyl, and
R2 is H or halogen.

2. The method of claim 1, wherein the compound of formula (I) has an average molecular weight (Mw) of >300 Da.

3. The method of claim 1, wherein the compound of formula (I) has E 1% 1 cm (343-344 nm) of >200 nm.

4. The method of claim 1, wherein the ultraviolet radiation absorbing composition additionally comprises 3-(2H-benzotriazol-2-yl)-5-(1,1-dimethylethyl)-4-hydroxy-benzenepropanoic acid methyl ester, 3-(2H-benzotriazol-2-yl)-5-(1,1-dimethylethyl)-4-hydroxy-benzenepropanoic acid, methanol, and/or tin.

5. The method of claim 1, having a concentration of 3-(2H-benzotriazol-2-yl)-5-(1,1-dimethylethyl)-4-hydroxy-benzenepropanoic acid methyl ester and/or 3-(2H-benzotriazol-2-yl)-5-(1,1-dimethylethyl)-4-hydroxy-benzenepropanoic acid, in the ultraviolet radiation absorbing composition of ≤5.0 wt.-%, based on a total weight of the ultraviolet radiation absorbing composition.

6. The method of claim 1, having a sum of concentrations of 3-(2H-benzotriazol-2-yl)-5-(1,1-dimethylethyl)-4-hydroxy-benzenepropanoic acid and 3-(2H-benzotriazol-2-yl)-5-(1,1-dimethylethyl)-4-hydroxy-benzenepropanoic acid methyl ester in the ultraviolet radiation absorbing composition of ≤5.0 wt.-%, based on a total weight of the ultraviolet radiation absorbing composition.

7. The method of claim 1, wherein a tin concentration in the ultraviolet radiation absorbing composition is <700 ppm.

8. The method of claim 1, wherein the ultraviolet radiation absorbing composition is essentially free of tin.

9. The method of claim 1, wherein a methanol concentration in the ultraviolet radiation absorbing composition is <3,000 ppm.

10. The method of claim 1, wherein the compound of formula (I) comprises an amount of covalently bound chromophores of >70 wt.-%, based on a total weight of the compound of the formula (I).

11. A shaped artificial polymer article, comprising a polymer that is a synthetic polymer and/or a natural elastomer,
wherein the polymer comprises an ultraviolet radiation absorbing composition comprising the compound of formula (I)

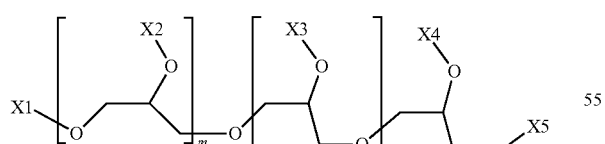
(I)

wherein
n and m are independently a number in a range of from 0 to 20, at least one of m and n being ≥1;
X1, X2, X3, X4, and X5 are independently H, C(O)R1, or a group of formula (II)

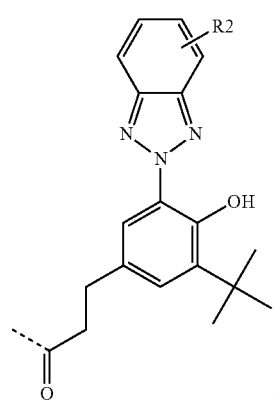
(II)

wherein R1 is $C_8$-$C_{24}$-alkyl, and
R2 is H or halogen.

12. The article of claim 11, which is an extruded, molded, or calendered shaped artificial polymer article.

13. The article of claim 11, which is a film, pipe, cable, tape, sheet, container, frame, fiber, or monofilament.

14. An extruded, molded, or calendered polymer composition, comprising:
(1) a synthetic polymer and/or a natural elastomer; and
(2) an ultraviolet radiation absorbing composition comprising a compound of formula (I)

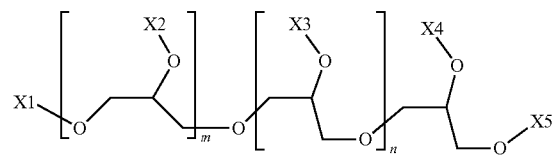
(I)

wherein
n and m are independently a number in a range of from 0 to 20, at least one of m and n being ≥1;
X1, X2, X3, X4, and X5 are independently H, C(O)R1, or a group of formula (II)

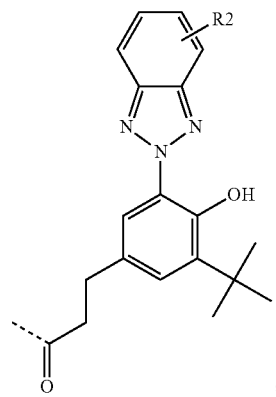
(II)

wherein R1 is $C_8$-$C_{24}$-alkyl, and
R2 is H or halogen.

15. The composition of claim 14, wherein the compound of formula (I) is present in an amount of from 0.001 to 10 wt. %, based on total composition weight.

16. The method of claim 1, wherein at least one of X1, X2, X3, X4, and X5 is H.

17. The method of claim 1, wherein at least one of X1, X2, X3, X4, and X5 is C(O)R1.

18. The method of claim 1, wherein at least one of X1, X2, X3, X4, and X5 is the group of formula (II).

\* \* \* \* \*